(12) United States Patent
Hanmura et al.

(10) Patent No.: US 7,871,465 B2
(45) Date of Patent: *Jan. 18, 2011

(54) INK COMPOSITION, AND INK JET RECORDING METHOD AND RECORDED MATTER USING THE SAME

(75) Inventors: Masahiro Hanmura, Kawasaki (JP); Kazuhiko Kitamura, Matsumoto (JP); Yasuhiro Oki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 11/597,729

(22) PCT Filed: May 25, 2005

(86) PCT No.: PCT/JP2005/009559
§ 371 (c)(1),
(2), (4) Date: Oct. 19, 2007

(87) PCT Pub. No.: WO2005/116150
PCT Pub. Date: Dec. 8, 2005

(65) Prior Publication Data
US 2008/0047461 A1 Feb. 28, 2008

(30) Foreign Application Priority Data

May 28, 2004 (JP) .............................. 2004-158865
May 28, 2004 (JP) .............................. 2004-158866

(51) Int. Cl.
*C09D 11/02* (2006.01)
(52) U.S. Cl. .................. 106/31.49; 106/31.58
(58) Field of Classification Search .............. 106/31.58, 106/31.49; 347/100
See application file for complete search history.

(56) References Cited

U.S. PATENT DOCUMENTS

| 4,163,675 | A | | 8/1979 | Hirano et al. | |
| 5,258,065 | A | | 11/1993 | Fujisawa | |
| 6,231,653 | B1 | * | 5/2001 | Lavery et al. | 106/31.58 |
| 6,319,309 | B1 | * | 11/2001 | Lavery et al. | 106/31.58 |
| 6,358,304 | B1 | * | 3/2002 | Kapoor | 106/31.86 |
| 7,083,669 | B2 | * | 8/2006 | Fukumoto et al. | 106/31.49 |
| 7,211,132 | B2 | * | 5/2007 | Oki et al. | 106/31.49 |
| 7,323,045 | B2 | * | 1/2008 | Hanmura et al. | 106/31.47 |
| 7,435,292 | B2 | * | 10/2008 | Hanmura et al. | 106/31.48 |
| 7,691,192 | B2 | * | 4/2010 | Oki et al. | 106/31.49 |
| 2004/0003755 | A1 | * | 1/2004 | Fukumoto et al. | 106/31.58 |
| 2008/0022895 | A1 | * | 1/2008 | Oki et al. | 106/31.49 |

FOREIGN PATENT DOCUMENTS

| EP | 1 357 158 | 10/2003 |
| JP | 6-256679 | 9/1994 |
| JP | 6-264015 | 9/1994 |
| JP | 2000-109735 | 4/2000 |
| JP | 2000-256594 | 9/2000 |
| JP | 2001-207095 | 7/2001 |
| JP | 2002-121439 | 4/2002 |
| JP | 2002-371079 | 12/2002 |
| JP | 2004-98597 | 4/2004 |
| WO | 02/060994 | 8/2002 |
| WO | 2005/030887 | 4/2005 |
| WO | WO 2005/030886 | * 4/2005 |

OTHER PUBLICATIONS

Patent Abstracts of Japan and JPO computer English translation of JP 2002-371079 dated Dec. 26, 2002.
Patent Abstracts of Japan of JP 6-256679 dated Sep. 13, 1994.

* cited by examiner

*Primary Examiner*—Helene Klemanski
(74) *Attorney, Agent, or Firm*—Ladas & Parry LLP

(57) ABSTRACT

Problem: To improve clogging and ink droplet deflection.
Solving Means: An ink composition comprising at least water, a colorant and an aromatic compound having a carboxyl group, which contains at least one member selected from the group consisting of a sodium ion, a potassium ion and an ammonium ion and also contains a lithium ion. Alternatively, an ink composition comprising at least water, a specific cyan dye and an aromatic compound having a carboxyl group, which contains a lithium ion and also contains a sodium ion and/or a potassium ion.

11 Claims, No Drawings

INK COMPOSITION, AND INK JET RECORDING METHOD AND RECORDED MATTER USING THE SAME

TECHNICAL FIELD

The present invention relates to an ink jet composition suitable for ink jet recording, particularly, an ink composition excellent in print fastness (mainly, gas resistance, light fastness, and moisture resistance and bronzing resistance and improved in restoration from clogging and in measures to ink droplet deflection, and also relates to an ink jet recording method using the same and a recorded matter which is recorded by the recording method.

BACKGROUND ART

Ink jet recording is a method of recording a character or image (hereinafter sometimes simply referred to as an "image") on the surface of a recording medium by ejecting an ink composition as small liquid droplets from fine nozzles. As the ink jet recording system, there are practically used a method of converting an electrical signal into a mechanical signal using an electrostrictive element and intermittently ejecting an ink composition stored in the nozzle head part to record a character or an image on the surface of a recording medium, a method of rapidly heating an ink composition stored in the nozzle head part at a portion very close to the ejection part to generate bubbles and intermittently ejecting the ink composition using the volume expansion due to bubbles to record a character or an image on the surface of a recording medium, and the like methods.

As the ink composition for ink jet recording, in view of safety and printing property, there is generally used an ink composition wherein a dye of various types is dissolved in water, an organic solvent or a mixed solution thereof, and more strict conditions are required for various properties as compared with the ink composition for writing tools such as fountain pen and ballpoint pen.

In recent years, an ink jet printer is employed for the preparation of printed matters for advertisement. Since the printed matter prepared is disposed not only indoors of course but also outdoors sometimes, a high image-preserving property is required. The printed matter is exposed to various lights including sunlight and outside airs (e.g., ozone, nitrogen oxide, sulfur oxide), and hence attempts are being made to develop an ink composition excellent in the fastness to light and gas.

With regard to cyan dyes, cyan ink compositions excellent in fastness to light and gas have been developed (see, e.g., a pamphlet of WO02/060994). However, in the case of a metal phthalocyanine-base dye attempting improvement of gas resistance, a reddish view phenomenon (hereinafter referred to as a "bronzing phenomenon") is sometimes observed at the portion of high-duty printing such as solid printing (full solid of 100% duty). In such a case, since a color balance as the entire image becomes non-uniform and the image quality is decreased, improvements thereof are desired.

Furthermore, in recent years, a gloss paper is employed in many cases as a recording medium having a feeling close to photographic touch, however, due to a bronzing phenomenon caused by a specific color, the gloss feeling on the printed matter surface is fluctuated to seriously impair the feeling of image. Therefore, also from the standpoint of maintaining the uniform gloss feeling of the whole image, improvements are strongly desired.

Moreover, with regard to the ability of light fastness, the ability of a magenta ink composition is lowest and the composition restricts the life of light fastness of an ink set, so that a magenta ink composition excellent in light fastness and gas resistance has been developed (JP-A-2002-371079) but further improvement in moisture resistance has been desired.

As a means for solving these problems, the present inventors have proposed incorporation of an aromatic compound having a carboxyl group into an ink composition (JP-A-2002-254611, JP-A-2003-090345, and JP-A-2003-339668). It is confirmed that the above aromatic compound having a carboxyl group is remarkably excellent in an effect of improving the bronzing phenomenon and results in an outstanding improvement in clogging resistance when the compound is incorporated as a lithium salt or is incorporated together with lithium hydroxide as a neutralizing agent.

In these embodiments, a sufficient clogging resistance is assured under conditions that the printer is used in a correct state and a printing head is returned to its home position and is capped to wait next printing.

DISCLOSURE OF THE INVENTION

However, in the case that an electric power is discontinued during printing of a printer, a printing head stops at a position which is not its home position and thus is left standing without capping. Under the condition, even in the above embodiments, there have occurred clogging owing to precipitation of the lithium salt of the aromatic compound having a carboxyl group and ink droplet deflection owing to corrosion and exfoliation of nozzle plates, so that there is room for further improvement.

Accordingly, an object of the invention is to provide an ink composition which further prevents clogging and ink droplet deflection and improves reliability in quality without decreasing image quality (bronzing resistance) and image-reserving properties (light fastness and gas resistance, moisture resistance), as well as a ink jet recording method and a recorded matter using the same.

The present inventors have found that precipitation of a lithium salt of an aromatic compound having a carboxyl group can be prevented by (A) incorporating at least one member selected from the group consisting of a sodium ion, a potassium ion, and an ammonium ion in an ink composition together with a lithium ion to be incorporated along with the aromatic compound having a carboxyl group or (B) incorporating a sodium ion and/or a potassium ion in an ink composition together with a lithium ion to be incorporated along with the above carboxyl group or to be incorporated as a counter cation of a cyan dye. Moreover, they have found that an effect of preventing precipitation of a lithium salt is increased by further containing urea. Based on these findings, they have accomplished the invention.

That is, the invention has the following constitutions:

The invention comprises the invention according to concept (A), i.e.,

1. An ink composition comprising at least water, a colorant and an aromatic compound having a carboxyl group, which contains at least one member selected from the group consisting of a sodium ion, a potassium ion and an ammonium ion, and also contains a lithium ion; and the invention according to concept (B), i.e., 2. An ink composition comprising at least water, a cyan dye represented by the general formula (I) shown below and an aromatic compound having a carboxyl group, which contains a lithium ion and also contains a sodium ion and/or a potassium ion:

[Chem. 1]

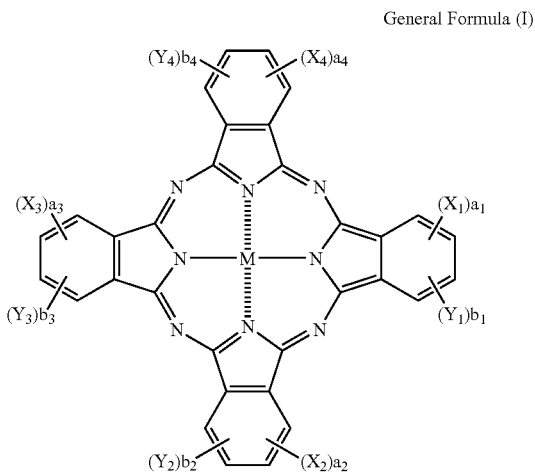

General Formula (I)

[Chem. 2]

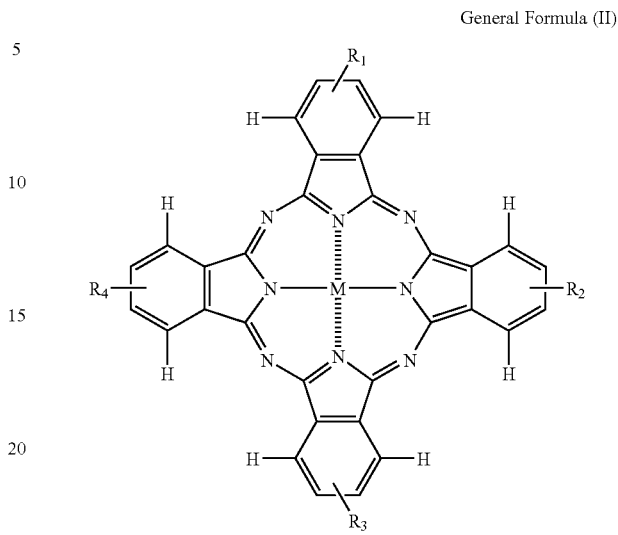

General Formula (II)

wherein $X_1$, $X_2$, $X_3$ and $X_4$ each independently represents either —SO—Z or —SO$_2$—Z where each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, or an ionic hydrophilic group, and each group may further have a substituent;

$a_1$ to $a_4$ and $b_1$ to $b_4$ represents the number of substituents $X_1$ to $X_4$ and $Y_1$ to $Y_4$, respectively, $a_1$ to $a_4$ each independently represents an integer of 0 to 4, provided that the case where all of $a_1$ to $a_4$ are 0 at the same time is excluded, and $b_1$ to $b_4$ each independently represents an integer of 0 to 4; and M represents a hydrogen atom, a metal element or an oxide, hydroxide or halide thereof;

provided that at least one of $X_1$, $X_2$, $X_3$, $X_4$, $Y_1$, $Y_2$, $Y_3$ and $Y_4$ is an ionic hydrophilic group or a group having an ionic hydrophilic group as a substituent, as the main gist thereof and also comprises the following dependent inventions.

3. The ink composition according to the above 2, wherein the cyan dye represented by the above general formula (I) is represented by the following general formula (II):

wherein M has the same meaning as in the general formula (I), $R_1$ to $R_4$ each independently represents —SO$_2$Z, and Z has the same meaning as in the general formula (I), provided that at least one of four Z's has an ionic hydrophilic group as a substituent.

4. The ink composition according to the above 3, wherein the above cyan dye is a cyan dye of the general formula (II) where M is a copper element and Z having an ionic hydrophilic group is a sulfoalkyl group.

5. The ink composition according to the above 4, wherein the counter cation of the sulfoalkyl group is a lithium cation.

6. The ink composition according to any one of the above 1 to 5, which further contains urea.

7. The ink composition according to the above 6, wherein the urea is contained in an amount of 1 to 6% by weight based on the ink composition.

8. The ink composition according to any one of the above 1, 6 and 7, wherein the molar ratio of the total of the at least one member selected from the group consisting of a sodium ion, a potassium ion and an ammonium ion and the lithium ion relative to the aromatic compound having a carboxyl group is from 1:5 to 10:8.

9. The ink composition according to the above 8, wherein the molar ratio of the lithium ion relative to the at least one member selected from the group consisting of a sodium ion, a potassium ion and an ammonium ion is from 8:1 to 1:1.

10. The ink composition according to any one of the above 2 to 7, wherein the number of moles of the lithium ion is 1.2 times or more and the total of the number of the moles of the sodium ion and the potassium ion is 0.7 time or less, each relative to the number of moles of the sulfoalkyl group having an ionic hydrophilic group of the cyan dye.

11. The ink composition according to any one of the above 2 to 7 and 10, wherein the total of the number of the moles of the sodium ion and the potassium ion is 0.3 time or less relative to the number of moles of the carboxyl group of the aromatic compound having a carboxyl group.

12. The ink composition according to any one of the above 2 to 7 and 10 to 11, wherein the total of the number of the moles of the lithium ion, the sodium ion and the potassium ion is from 0.8 time to 1.2 times relative to the total of the number of moles of the sulfoalkyl group having an ionic hydrophilic group of the cyan dye and the number of moles of the carboxyl group of the aromatic compound having a carboxyl group.

13. The ink composition according to any one of the above 1 to 12, wherein the aromatic compound having a carboxyl group is an aromatic compound having one carboxyl group.

14. The ink composition according to any one of the above 1 to 13, wherein the aromatic compound having a carboxyl group is a compound having a naphthalene skeleton.

15. The ink composition according to the above 14, wherein the compound having a naphthalene skeleton is a compound having a carboxyl group at its 2-position.

16. The ink composition according to the above 15, wherein the compound having a carboxyl group at its 2-position and having a naphthalene skeleton is at least one member selected from 1-hydroxy-2-naphthoic acid, 2-naphthoic acid, 3-hydroxy-2-naphthoic acid, 6-hydroxy-2-naphthoic acid, 3-methoxy-2-naphthoic acid, 6-methoxy-2-naphthoic acid, 6-ethoxy-2-naphthoic acid, and 6-propoxy-2-naphthoic acid.

17. The ink composition according to any one of the above 1 to 16, which comprises the aromatic compound having a carboxyl group in an amount of 0.1 to 10% by weight based on the total amount of the ink composition.

18. The ink composition according to any one of the above 1 to 17, wherein the content ratio of the colorant (including the cyan dye) and the aromatic compound having a carboxyl group is from 1:0.2 to 1:10 in terms of weight ratio.

19. The ink composition according to any one of the above 1 to 18, which is used in an ink jet recording method.

20. The ink composition according to the above 19, wherein the above ink jet recording method is a recording method using an ink jet head which forms an ink droplet by mechanical deformation of an electrostrictive element.

21. An ink jet recording method comprising ejecting a liquid droplet of an ink composition, and attaching the liquid droplet onto a recording medium, thereby performing the recording, wherein the ink composition according to any one of the above 1 to 20 is used as the ink composition.

22. A recorded matter which is recorded by using the ink composition according to any one of the above 1 to 20 or recorded by the recording method according to the above 21.

According to the invention, since precipitation of the aromatic compound having a carboxyl group in an ink composition is prevented, there are provided an ink composition which further improves reliability in clogging and ink droplet deflection without decreasing a high image quality (bronzing resistance) and image-reserving properties (light fastness and gas resistance, moisture resistance), as well as a ink jet recording method and a recorded matter using the same.

BEST MODE FOR CARRYING OUT THE INVENTION

The invention according to the above concept (A) is an ink composition comprising at least a colorant and an aromatic compound having a carboxyl group in water or an aqueous medium comprising water and a water-soluble organic solvent, which composition contains at least one member selected from the group consisting of a sodium ion, a potassium ion and an ammonium ion, and also contains a lithium ion.

Moreover, the invention according to the above concept (B) is an ink composition comprising at least a cyan dye represented by the general formula (I) and an aromatic compound having a carboxyl group in water or an aqueous medium comprising water and a water-soluble organic solvent, which composition contains a lithium ion and also contains a sodium ion and/or a potassium ion.

In either of the above inventions, the ink composition may further contain urea, if necessary. In addition thereto, it may contain a humectant, a viscosity adjusting agent, a pH adjusting agent, and other additives.

First, among the embodiments of the invention according to the concept (A), the colorant to be used will be described.

The colorant to be used in the invention may be any colorant as far as it is apt to cause the bronzing phenomenon but the bronzing phenomenon is eliminated by the aromatic compound having a carboxyl group. Furthermore, use of a copper phthalocyanine-based dye is preferred. The copper phthalocyanine-based dye includes Direct Blue 199.

Moreover, the colorant may be any colorant as far as it is excellent in image fastness such as light fastness and gas resistance but poor in moisture resistance and moisture resistance is improved by the aromatic compound having a carboxyl group.

Specific examples of such a cyan dye include compounds represented by the following general formula (1) and salts thereof.

Formula (1)

[Chem. 3]

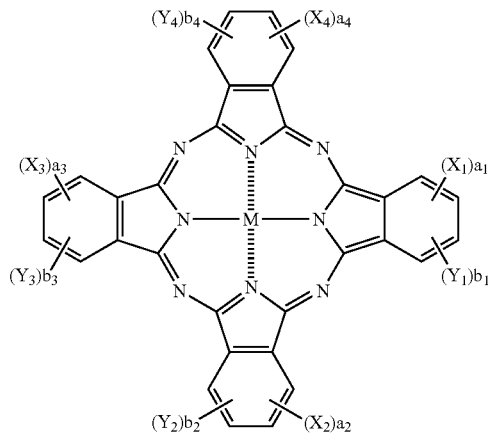

General Formula (I)

The compounds represented by the above formula (1) and salts thereof may be produced by any processes but, for example, may also be produced by the following process:

1) 1-Methylamino-4-bromoanthraquinone is reacted with benzoylacetic acid ethyl ester in a solvent to obtain 1-benzoyl-6-bromo-2,7-dihydro-3-methyl-2,7-dioxo-3H-dibenzo[f,ij]isoquinoline.

2) Then, the compound obtained in the above 1) is reacted with m-aminoacetanilide in a solvent to obtain 3'-[1-benzoyl-2,7-dihydro-3-methyl-2,7-dioxo-3H-dibenzo[f,ij]isoquinoline-6-ylamino]-acetanilide.

3) Then, the compound obtained in the above 2) is reacted in fumed sulfuric acid to obtain trisodium 6-amino-4-[2,7-dihydro-3-methyl-1-(3-sulfonatobenzoyl)-2,7-dioxo-3H-dibenzo[f,ij]isoquinoline-6-ylamino]-benzene-1,3-disulfonate.

4) Then, the compound obtained in the above 3) is reacted with cyanuric chloride in water to obtain a primary condensate, which is further reacted with a diamine having a linking group A to obtain a secondary condensate.

5) Then, the compound obtained in the above 4) is used as it is or is hydrolyzed or reacted with ammonia to form a tertiary condensate, whereby a target compound represented by the above general formula (1) is obtained.

As the colorant for use in the ink composition of the invention, a single species can be selected from the compounds represented by the above formula (1) and salts thereof and used but a plurality of species may be selected and used.

The magenta ink composition containing at least one member selected from the group consisting of the compounds represented by the above formula (1) and salts thereof is excellent in light fastness as compared with the magenta ink compositions containing magenta dyes hitherto used.

Moreover, the compound represented by the formula (2) shown below also exhibits improving effects on light fastness and gas resistance and a single species may be used or a plurality of species may be used in combination.

Formula (2)

[Chem. 5]

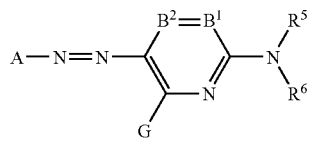

wherein A represents a residue of a five-membered heterocyclic diazo component $A-NH_2$. $B^1$ and $B^2$ each represents $-CR^1=$ or $-CR^2=$ or either one represents a nitrogen atom and the other represents $-CR^1=$ or $-CR^2=$. $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and each group may further have a substituent. G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl group or an aryl group or a heterocyclic group, an acylamino group, a ureido group, a sulfamoylamino group, an alkoxycarbonylamino group, an aryloxycarbonylamino group, an alkyl- or arylsulfonylamino group, a nitro group, an alkyl- or arylthio group, an alkyl- or arylsulfonyl group, an alkyl- or arylsulfinyl group, a sulfamoyl group, a sulfo group, or a heterocyclic thio group, and each group may further have a substituent. In addition, $R^1$ and $R^5$ or $R^5$ and $R^6$ may be combined to form a five-membered or six-membered ring.

The following will describe the compound represented by the formula (2) usable as the colorant in the invention.

In the formula (2), A represents a residue of a five-membered heterocyclic diazo component $A-NH_2$. Examples of the heteroatom of the five-membered heterocyclic ring include N, O, and S. The heterocyclic ring is preferably nitrogen-containing five-membered heterocyclic ring and an aliphatic ring, an aromatic ring, or the other ring may be fused to the heterocyclic ring. Examples of preferred heterocyclic ring for A include a pyrazole ring, an imidazole ring, a thiazole ring, an isothiazole ring, a thiadiazole ring, a benzothiazole ring, a benzoxazole ring, and a benzisothiazole ring. Each heterocyclic group may further have a substituent. Of these, preferred are a pyrazole ring, an imidazole ring, an isothiazole ring, a thiadiazole ring, and a benzothiazole ring represented by the following general formulae (a) to (f).

[Chem. 6]

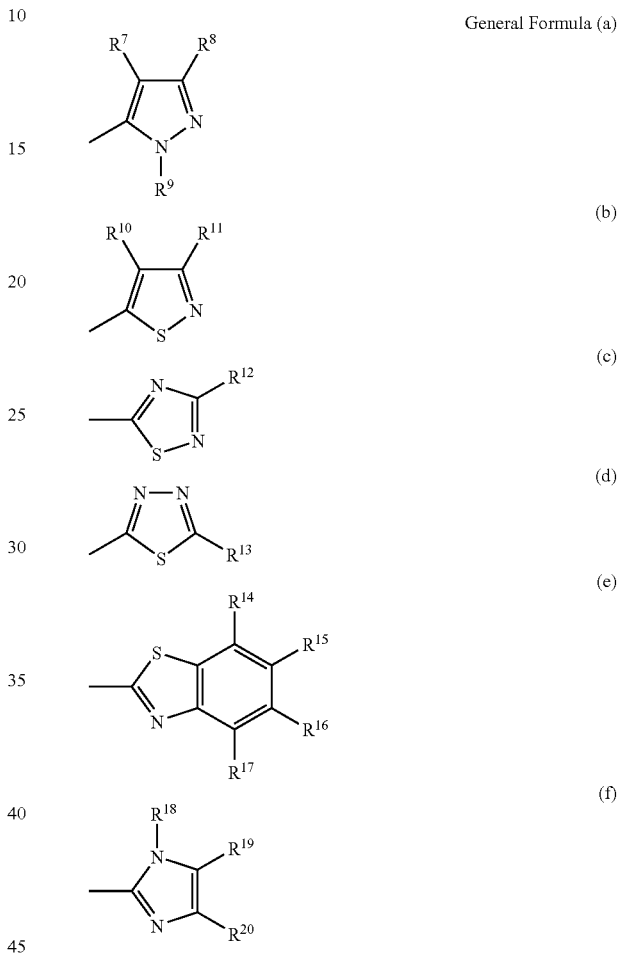

$R^7$ to $R^{20}$ in the above general formulae (a) to (f) represent the same substituents as the substituents G, $R^1$, and $R^2$ to be described below. Among the above general formulae (a) to (f), preferred are the pyrazole ring and isothiazole rings represented by the general formulae (a) and (b) and most preferred is the pyrazole ring represented by the general formula (a).

$B^1$ and $B^2$ each represents $-CR^1=$ or $-CR^2=$ or either one represents a nitrogen atom and the other represents $-CR^1=$ or $-CR^2=$ but more preferred is those wherein each represents $-CR^1=$ or $-CR^2=$.

$R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, or a sulfamoyl group, and each group may further have a substituent. Preferred substituents represented by $R^5$ and $R^6$ include a hydrogen atom, an aliphatic group, an aromatic group, a heterocyclic group, an acyl group, and an alkyl- or arylsulfonyl group. Further preferred is a hydrogen atom, an aromatic group, a heterocyclic group, an acyl group, or an alkyl- or arylsulfonyl group. Most preferred is a hydrogen atom, an aryl group, or a heterocyclic group, and each group may further have a substituent. However, $R^5$ and $R^6$ are not a hydrogen atom at the same time.

G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl group or an aryl group or a heterocyclic group, an acylamino group, a ureido group, a sulfamoylamino group, an alkoxycarbonylamino group, an aryloxycarbonylamino group, an alkyl- or arylsulfonylamino group, a nitro group, an alkyl- or arylthio group, a heterocyclic thio group, an alkyl- or arylsulfonyl group, an alkylsulfinyl group, an arylsulfinyl group, a sulfamoyl group, or a sulfo group, and each group may further have a substituent.

Preferable substituents expressed by G include a hydrogen atom, a halogen atom, an aliphatic group, an aromatic group, a hydroxy group, an alkoxy group, an aryloxy group, an acyloxy group, a heterocyclic oxy group, an amino group substituted by an alkyl group or an aryl group or a heterocyclic group, an acylamino group, a ureido group, a sulfamoylamino group, an alkoxycarbonylamino group, an aryloxycarbonylamino group, an alkyl- or arylthio group, and a heterocyclic thio group. More preferred is a hydrogen atom, a halogen atom, an alkyl group, a hydroxy group, an alkoxy group, an aryloxy group, an acyloxy group, an amino group substituted by an alkyl group or an aryl group or a heterocyclic group, or an acylamino group. Most preferred is a hydrogen atom, an arylamino group, or an amido group. Each group may further have a substituent.

Preferable substituents expressed by $R^1$ and $R^2$ include a hydrogen atom, an alkyl group, an alkoxycarbonyl group, a carboxyl group, a carbamoyl group and a cyano group. Each group may further have a substituent. $R^1$ and $R^5$ or $R^5$ and $R^6$ may be combined to form a five-membered or six-membered ring. When the respective substituents shown as A, $R^1$, $R^2$, $R^5$, $R^6$, and G have further substituents, examples of such further substituents include those listed in the explanations of G, $R^1$, and $R^2$.

In the case where the azo dye represented by the formula (2) is a water-soluble dye, the dye preferably further has an ionic hydrophilic group as a substituent on any position of A, $R^1$, $R^2$, $R^5$, $R^6$, and G. The ionic hydrophilic group as a substituent includes a sulfo group, a carboxyl group, and a quaternary ammonium group. As the ionic hydrophilic group, preferred is a carboxyl group or a sulfo group, particularly preferred is a sulfo group. The carboxyl group and the sulfo group each may be in the salt state, and examples of the counter ion for forming the salt include an alkali metal ion (e.g., a sodium ion, a potassium ion, a lithium ion), an ammonium ion, and an organic cation (e.g., a tetramethylammonium ion, a tetramethylguanidium ion).

The substituents represented by G, $R^1$, and $R^2$ will be described in detail below.

The halogen atom includes a fluorine atom, a chlorine atom and a bromine atom.

The aliphatic group herein means an alkyl group, a substituted alkyl group, an alkenyl group, a substituted alkenyl group, an alkynyl group, a substituted alkynyl group, an aralkyl group, and a substituted aralkyl group. The aliphatic group may be branched or may form a ring. The number of carbon atoms in the aliphatic group is preferably from 1 to 20, more preferably from 1 to 16. The aryl moiety in the aralkyl group and the substituted aralkyl group is preferably phenyl or naphthyl, particularly preferably phenyl. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group, and an allyl group.

The aromatic group herein means an aryl group and a substituted aryl group. The aryl group is preferably phenyl or naphthyl, particularly preferably phenyl. The number of carbon atoms in the aromatic group is preferably from 6 to 20, more preferably from 6 to 16. Examples of the aromatic group include phenyl, p-tolyl, p-methoxyphenyl, o-chlorophenyl, and m-(3-sulfopropylamino)phenyl. The heterocyclic group includes a heterocyclic group having a substituent, and an unsubstituted heterocyclic group. An aliphatic ring, an aromatic ring, or another heterocyclic ring may be fused to the heterocyclic ring. The heterocyclic group is preferably a five-membered or six-membered heterocyclic group. Examples of the substituent include an aliphatic group, a halogen atom, an alkyl- or arylsulfonyl group, an acyl group, an acylamino group, a sulfamoyl group, a carbamoyl group, and an ionic hydrophilic group. Examples of the heterocyclic group include a 2-pyridyl group, a 2-thienyl group, a 2-thiazolyl group, a 2-benzothiazolyl group, a 2-benzoxazolyl group, and a 2-furyl group.

The carbamoyl group includes a carbamoyl group having a substituent and an unsubstituted carbamoyl group. Examples of the substituent therefor include an alkyl group. Examples of the carbamoyl group include a methylcarbamoyl group and a dimethylcarbamoyl group.

The alkoxycarbonyl group includes an alkoxycarbonyl group having a substituent, and an unsubstituted alkoxycarbonyl group. The alkoxycarbonyl group is preferably an alkoxycarbonyl group having from 2 to 12 carbon atoms. Examples of the substituent include an ionic hydrophilic group. Examples of the alkoxycarbonyl group include a methoxycarbonyl group and an ethoxycarbonyl group.

The aryloxycarbonyl group includes an aryloxycarbonyl group having a substituted, and an unsubstituted aryloxycarbonyl group. The aryloxycarbonyl group is preferably an aryloxycarbonyl group having from 7 to 12 carbon atoms. Examples of the substituent include an ionic hydrophilic group. Examples of the aryloxycarbonyl group include a phenoxycarbonyl group.

The acyl group includes an acyl group having a substituent, and an unsubstituted acyl group. The acyl group is preferably an acyl group having from 1 to 12 carbon atoms. Examples of the substituent include an ionic hydrophilic group. Examples of the acyl group include an acetyl group and a benzoyl group.

The alkoxy group includes an alkoxy group having a substituent, and an unsubstituted alkoxy group. The alkoxy group is preferably an alkoxy group having from 1 to 12 carbon atoms. Examples of the substituent include an alkoxy group, a hydroxy group, and an ionic hydrophilic group. Examples of the alkoxy group include a methoxy group, an ethoxy group, an isopropoxy group, a methoxyethoxy group, a hydroxyethoxy group, and a 3-carboxypropoxy group.

The aryloxy group includes an aryloxy group having a substituent, and an unsubstituted aryloxy group. The aryloxy group is preferably an aryloxy group having from 6 to 12 carbon atoms. Examples of the substituent include an alkoxy group and an ionic hydrophilic group. Examples of the aryloxy group include a phenoxy group, a p-methoxyphenoxy group, and an o-methoxyphenoxy group.

The acyloxy group includes an acyloxy group having a substituent, and an unsubstituted acyloxy group. The acyloxy group is preferably an acyloxy group having from 1 to 12 carbon atoms. Examples of the substituent include an ionic hydrophilic group. Examples of the acyloxy group include an acetoxy group and a benzoyloxy group.

The carbamoyloxy group includes a carbamoyloxy group having a substituent, and an unsubstituted carbamoyloxy group. Examples of the substituent include an alkyl group. Examples of the carbamoyloxy group include an N-methylcarbamoyloxy group.

The amino group substituted by an alkyl group, an aryl group, or a heterocyclic group may further have a substituent. An unsubstituted amino group is not included. The alkylamino group is preferably an alkylamino group having from 1 to 6 carbon atoms. Examples of the substituent include an ionic hydrophilic group. Examples of the alkylamino group include a methylamino group and a diethylamino group. The arylamino group includes an arylamino group having a substituent, and an unsubstituted arylamino group. The arylamino group is preferably an arylamino group having from 6 to 12 carbon atoms. Examples of the substituent include a halogen atom and an ionic hydrophilic group. Examples of the arylamino group include an anilino group and a 2-chloroanilino group.

The acylamino group includes an acylamino group having a substituent. The acylamino group is preferably an acylamino group having from 2 to 12 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a ureido group having a substituent, and an unsubstituted ureido group. The ureido group is preferably a ureido group having from 1 to 12 carbon atoms. Examples of the substituent include an alkyl group and an aryl group. Examples of the ureido group include a 3-methylureido group, a 3,3-dimethylureido group, and a 3-phenylureido group.

The sulfamoylamino group includes a sulfamoylamino group having a substituent, and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent, and an unsubstituted alkoxycarbonylamino group. The alkoxycarbonylamino group is preferably an alkoxycarbonylamino group having from 2 to 12 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent, and an unsubstituted aryloxycarbonylamino group. The aryloxycarbonylamino group is preferably an aryloxycarbonylamino group having from 7 to 12 carbon atoms. Examples of the substituent include an ionic hydrophilic group. Examples of the above aryloxycarbonylamino group include a phenoxycarbonylamino group.

The alkyl- or arylsulfonylamino group includes an alkyl- or arylsulfonylamino group having a substituent, and an unsubstituted alkyl- or arylsulfonylamino group. The sulfonylamino group is preferably a sulfonylamino group having from 1 to 12 carbon atoms. Examples of the substituent include an ionic hydrophilic group. Examples of the sulfonylamino group include a methanesulfonylamino group, an N-phenylmethanesulfonylamino group, a benzenesulfonylamino group, and a 3-carboxybenzenesulfonylamino group.

The alkyl-, aryl- or heterocyclic-thio group includes an alkyl-, aryl- or heterocyclic-thio group having a substituent and an unsubstituted alkyl-, aryl- or heterocyclic-thio group. The alkyl-, aryl- or heterocyclic-thio group is preferably an alkyl-, aryl- or heterocyclic-thio group having from 1 to 12 carbon atoms. Examples of the substituent include an ionic hydrophilic group. Examples of the alkyl-, aryl- or heterocyclic-thio group include a methylthio group, a phenylthio group, and a 2-pyridylthio group.

Examples of the alkyl- or arylsulfonyl group include a methanesulfonyl group and a phenylsulfonyl group, respectively. Examples of the alkyl- or arylsulfonyl group include a methanesulfonyl group and a phenylsulfonyl group, respectively.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

In the present invention, the azo dye particularly preferred is represented by the following formula (3).

Formula (3)

[Chem. 7]

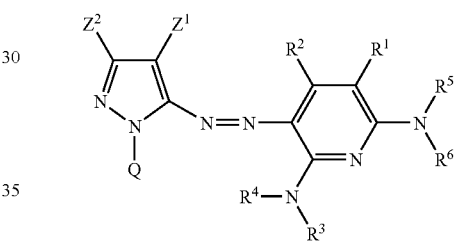

In the formula (3), $Z^1$ represents an electron-withdrawing group having a Hammett's substituent constant σp value of 0.20 or more. $Z^1$ is preferably an electron-withdrawing group having a σp value of 0.30 to 1.0. Specific preferred examples of the substituent include electron-withdrawing substituents described later. Among those, preferred are an acyl group having a carbon number of 2 to 12, an alkyloxycarbonyl group having a carbon number of 2 to 12, a nitro group, a cyano group, an alkylsulfonyl group having a carbon number of 1 to 12, an arylsulfonyl group having a carbon number of 6 to 18, a carbamoyl group having a carbon number of 1 to 12 and a halogenated alkyl group having a carbon number of 1 to 12, more preferred are a cyano group, an alkylsulfonyl group having a carbon number of 1 to 12, and an arylsulfonyl group having a carbon number of 6 to 18, and most preferred is a cyano group.

$R^1$, $R^2$, $R^5$, and $R^6$ have the same meanings as in formula (2). $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, preferably a hydrogen atom, an aromatic group, a heterocyclic group, an acyl group or an alkyl- or arylsulfonyl group, more preferably a hydrogen atom, an aromatic group, or a heterocyclic group. $Z^2$ represents a hydrogen atom, an aliphatic group, an aromatic group, or a heterocyclic group.

Q represents a hydrogen atom, an aliphatic group, an aromatic group, or a heterocyclic group. Particularly, Q is preferably a group comprising a nonmetallic atom group necessary for forming a 5- to 8-membered ring. The 5- to 8-membered ring may be substituted, may be a saturated ring, or may have an unsaturated bond. Particularly, Q is more preferably an aromatic group or a heterocyclic group. Preferred examples of the nonmetallic atom include a nitrogen atom, an oxygen atom, a sulfur atom, and a carbon atom. Specific examples of the 5- to 8-membered ring include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring, a thiane ring, and the like.

Each group explained with regard to the formula (3) may further have a substituent. In the case where these groups each further has a substituent, examples of the substituent include the substituents described with regard to the formula (2), the groups described as examples for G, $R^1$, and $R^2$, and an ionic hydrophilic group.

Here, the Hammett's substituent constant σp value used herein with regard to the substituent $Z^1$ will be described. The Hammett's rule is an empirical rule advocated by L. P. Hammett in 1935 so as to quantitatively discuss the effect of a substituent on the reaction or equilibrium of a benzene derivative, and its propriety is widely admitted at present. The substituent constant determined by the Hammett's rule includes a σp value and a σm value, and these values can be found in a large number of general publications and are described in detail, for example, in J. A. Dean (ed.), "Lange's Handbook of Chemistry", 12th ed., McGraw-Hill (1979), and Kagakuno Ryoiki (Chemistry Region), special number, No. 122, pp. 96-103, Nankodo (1979). In the invention, each substituent is limited or described by using the Hammett's substituent constant σp, but this does not mean that the substituent is limited only to those having a known value which can be found in the above-described publications. Needless to say, the substituent includes a substituent of which value is not known in publications but when measured based on the Hammett's rule, falls within the specified range. Furthermore, although formulae (2) and (3) of the invention include those which are not benzene derivatives, the σp value is used as a measure for showing the electron effect of the substituent irrespective of the substitution site. In the present invention, the σp value is used in such a meaning.

Examples of the electron-withdrawing group having a Hammett's substituent constant σp value of 0.60 or more include a cyano group, a nitro group, an alkylsulfonyl group (e.g., methanesulfonyl) and an arylsulfonyl group (e.g., benzenesulfonyl). Examples of the electron-withdrawing group having a Hammett's σp value of 0.45 or more include, in addition to those described above, an acyl group (e.g., an acetyl group), an alkoxycarbonyl group (e.g., a dodecyloxycarbonyl group), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl). Specific examples of the electron-withdrawing group having a σp value of 0.20 or more include, in addition to those described above, a halogen atom.

The preferred combination of substituents in the azo dye represented by the formula (2) is described below.

(i) $R^5$ and $R^6$ each is preferably a hydrogen atom, an alkyl group, an aryl group, a heterocyclic group, a sulfonyl group, or an acyl group, more preferably a hydrogen atom, an aryl group, a heterocyclic group, or a sulfonyl group, and most preferably a hydrogen atom, an aryl group, or a heterocyclic group. However, $R^5$ and $R^6$ are not a hydrogen atom at the same time.

(ii) G is preferably a hydrogen atom, a halogen atom, an alkyl group, a hydroxy group, an amino group, or an amido group, more preferably a hydrogen atom, a halogen atom, an amino group, or an amido group, and most preferably a hydrogen atom, an amino group, or an amido group.

(iii) A is preferably a pyrazole ring, an imidazole ring, an isothiazole ring, a thiadiazole ring, or a benzothiazole ring, more preferably a pyrazole ring or an isothiazole ring, and most preferably a pyrazole ring.

(iv) $B^1$ and $B^2$ each is preferably —$CR^1$═ or —$CR^2$═, and $R^1$ and $R^2$ each is preferably a hydrogen atom, a halogen atom, a cyano group, a carbamoyl group, a carboxyl group, an alkyl group, a hydroxy group or an alkoxy group, more preferably a hydrogen atom, a cyano group, a carbamoyl group, or an alkyl group.

As for the preferred combination of substituents in the compound represented by the formula (2), a compound where at least one of various substituents is the above preferred group is preferred, a compound where a larger number of various substituents are the above preferred groups is more preferred, and a compound where all substituents are the above preferred groups is most preferred.

The above compound represented by the formula (2) may be produced by any method but, for example, can be produced by the following method.

(a) A compound represented by the general formula (4) shown below is reacted with a diazotizing agent to form a diazonium salt.

(b) The diazonium salt formed in the above step (a) is reacted with a coupling agent represented by the general formula (5) shown below to form a compound represented by the above general formula (2).

(c) The compound formed in the above step (b) is reacted with an alkylating agent, an arylating agent, or a heterylating agent in the presence of a base to form a compound represented by the above general formula (2) in which a substituent such as alkyl group is introduced.

A-NH$_2$         Formula (4)

Formula (5)

[Chem. 8]

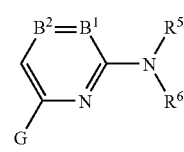

wherein A, G, $B^1$, $B^2$, $R^5$, and $R^6$ have the same meanings as in the case of the above formula (2).

Furthermore, in the case of introducing a water-soluble group into the compound of the above formula (2), an electrophilic reaction is used. The electrophilic reaction includes sulfonation, Mannich reaction, and Friedel-Crafts reaction and among these, sulfonation is preferred.

Specific examples of the compound represented by the formula (2) which can be preferably used in the invention are set forth below.

TABLE 1

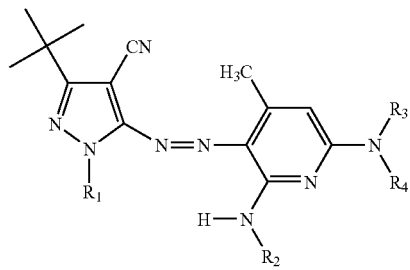

| Dye | $R_1$ | $R_2$ | $R_3$ | $R_4$ |
|---|---|---|---|---|
| 1 | 2-methylbenzothiazol-6-yl-SO$_3$Na | 2-methylbenzothiazol-6-yl-SO$_3$Na | 2,4,6-trimethyl-3-SO$_3$Na-phenyl | 2,4,6-trimethyl-3-SO$_3$Na-phenyl |
| 2 | 2-methylbenzothiazol-6-yl-SO$_2$NH-(3,5-di-COOK-phenyl) | 2-methylbenzothiazolyl | 2,4,6-trimethyl-3-SO$_3$K-phenyl | 2,4,6-trimethyl-3-SO$_3$K-phenyl |
| 3 | 2-methylbenzothiazol-6-yl-SO$_3$Li | 2-methylbenzothiazol-6-yl-SO$_3$Li | 3,5-dimethyl-4-SO$_3$Li-phenyl | 3,5-dimethyl-4-SO$_3$Li-phenyl |
| 4 | 2-methylbenzothiazol-6-yl-SO$_3$Na | 2-methylbenzothiazol-6-yl-SO$_3$Na | 3,5-dimethyl-4-CH$_2$N(CH$_2$COOH)$_2$-phenyl | 3,5-dimethyl-4-CH$_2$N(CH$_2$COOH)$_2$-phenyl |

TABLE 2

[Structure: pyrazole with tert-butyl and CN substituents, N-R1, linked via N=N azo to a pyridine ring bearing H3C-, NR3R4, and NH-R2 substituents]

| Dye | R₁ | R₂ | R₃ | R₄ |
|-----|----|----|----|----|
| 5 | 2-benzothiazolyl | 2-benzothiazolyl | 2,3,5-trimethyl-6-sulfonatopotassium-phenyl (CH₃, CH₃, CH₃, SO₃K) | 2,3,5-trimethyl-6-sulfonatopotassium-phenyl (CH₃, CH₃, CH₃, SO₃K) |
| 6 | 2-(6-sulfo-K)-benzothiazolyl | 2-benzothiazolyl | 2,3,5-trimethyl-6-SO₃K-phenyl | 2,3,5-trimethyl-6-SO₃K-phenyl |
| 7 | 2-(6-methyl)-benzothiazolyl | 2-(6-sulfo-K)-benzothiazolyl | 2,3,5-trimethyl-6-SO₃K-phenyl | 2,3,5-trimethyl-6-SO₃K-phenyl |

TABLE 3

[Structure: same pyrazole-azo-pyridine core as in Table 2]

| Dye | R₁ | R₂ | R₃ | R₄ |
|-----|----|----|----|----|
| 8 | 2-(6-sulfo-K)-benzothiazolyl | 2,3,5-trimethyl-6-SO₃K-phenyl | 2-(6-sulfo-K)-benzothiazolyl | 2,3,5-trimethyl-6-SO₃K-phenyl |

TABLE 3-continued

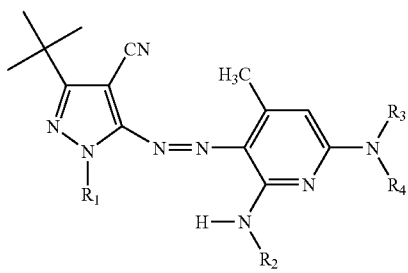

| Dye | R₁ | R₂ | R₃ | R₄ |
|---|---|---|---|---|
| 9 | 2-methylbenzothiazol-6-yl-SO₃Na | 2,4-dimethylphenyl-5-SO₃Na | 2-methylbenzothiazol-6-yl-SO₃Na | 2,4-dimethylphenyl-5-SO₃Na |
| 10 | 2-methylbenzothiazol-6-yl | 2,3,5-trimethylphenyl-4-SO₃K | 2-methylbenzothiazol-6-yl | 2,3,5-trimethylphenyl-4-SO₃K |
| 11 | 2-methylbenzothiazol-6-yl | 2,4,6-trimethyl-3,5-di(SO₃K)phenyl | 2-methylbenzothiazol-6-yl | 2,4,6-trimethyl-3,5-di(SO₃K)phenyl |
| 12 | 2-methyl-5-nitrobenzothiazol-6-yl | 2,4-dimethylphenyl-5-SO₃K | 2-methylbenzothiazol-6-yl-SO₃K | 2-methoxy-3-methylphenyl-5-SO₃K |

TABLE 4

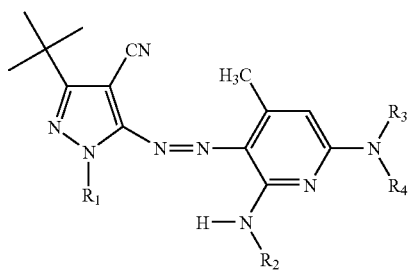

| Dye | R₁ | R₂ | R₃ | R₄ |
|---|---|---|---|---|
| 13 | 2-methylbenzothiazol-6-yl-SO₂NH-(3,5-dicarboxyphenyl) | 2,3,5,6-tetramethylphenyl-4-SO₃K | 2-methylbenzothiazol-6-yl | 2,3,5,6-tetramethylphenyl-4-SO₃K |

TABLE 4-continued
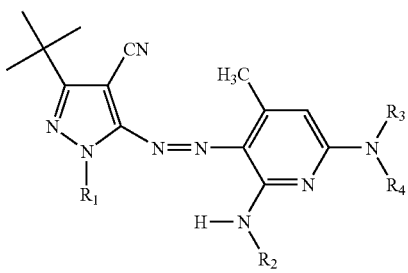
| Dye | $R_1$ | $R_2$ | $R_3$ | $R_4$ |
|---|---|---|---|---|
| 14 | 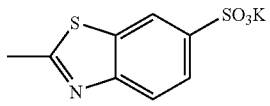 | 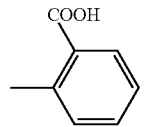 | 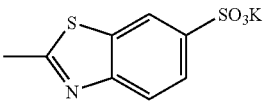 | 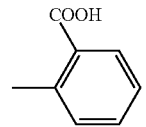 |
| 15 | 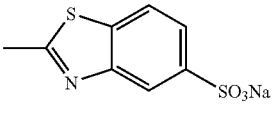 | 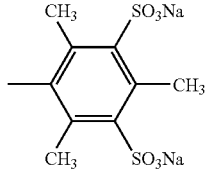 | 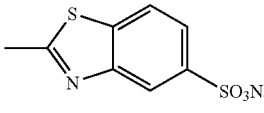 | 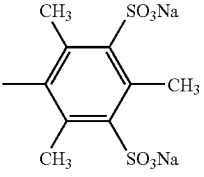 |
| 16 | 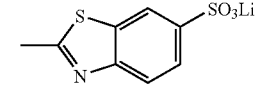 | 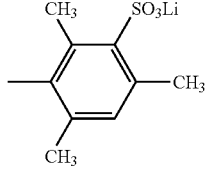 | 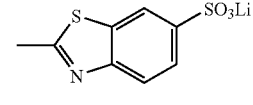 | 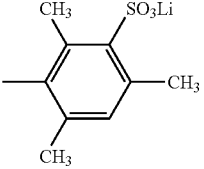 |
| 17 | 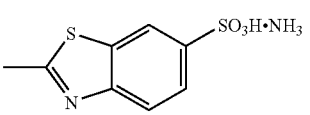 | 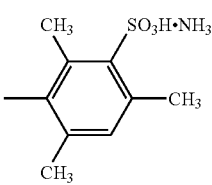 | 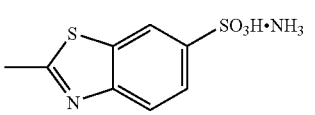 | 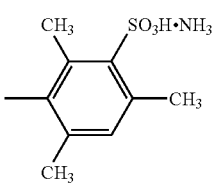 |

TABLE 5

[Structure: isothiazole-azo-pyridine dye with substituents R1, R2, R3, R4, R5, R6; CN group on isothiazole; H—N—R6 on pyridine]

| Dye | R₁ | R₂ | R₃ | R₄ | R₅ | R₆ |
|---|---|---|---|---|---|---|
| b-1 | CH₃ | H | CN | H | —C₆H₄—SO₃Na (para) | —C₆H₄—SO₃Na (para) |
| b-2 | CH₃ | H | H | SO₂CH₃ | 3,4-dimethylphenyl-SO₃Na | 2-methylphenyl-SO₃Na |

TABLE 6

[Structure: 1,2,4-thiadiazole-azo-pyridine dye with substituents R1–R6]

| Dye | R₁ | R₂ | R₃ | R₄ | R₅ | R₆ |
|---|---|---|---|---|---|---|
| c-1 | phenyl | H | CONH₂ | H | —C₆H₄—SO₃K (para) | —C₆H₄—SO₃K (para) |
| c-2 | —S—CH₂CH₂—SO₃K (via CH₃—S—) | CH₃ | H | 2-methyl-benzothiazol-6-yl-SO₃K | —C₆H₄—SO₃K (para) | —C₆H₄—SO₃K (para) |

The following will describe the cyan dye to be used as a colorant, i.e., the phthalocyanine compound represented by the general formula (I) will be described among the embodiments of the invention according to the concept (B).
[Chem. 9]

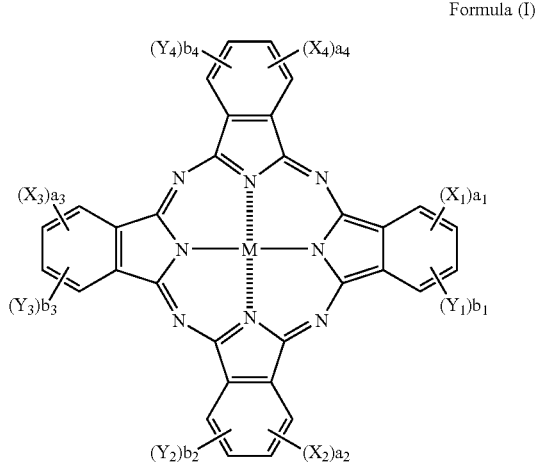

Formula (I)

In the above formula (I), $X_1$, $X_2$, $X_3$ and $X_4$ each independently represents either —SO—Z or —SO$_2$—Z, particularly preferably —SO$_2$—Z.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a substituted or unsubstituted alkyl group, a substituted or unsubstituted aryl group, or a substituted or unsubstituted heterocyclic group, more preferably a substituted alkyl group, a substituted aryl group, or a substituted heterocyclic group, still more preferably a substituted alkyl group or a substituted aryl group, and most preferably a substituted alkyl group.

The substituted or unsubstituted alkyl group represented by Z is preferably an alkyl group having from 1 to 30 carbon atoms. Examples of the substituent are the same as those of the substituent described later in the case where Z, $Y_1$, $Y_2$, $Y_3$ and $Y_4$ may further have a substituent.

The substituted or unsubstituted cycloalkyl group represented by Z is preferably a cycloalkyl group having from 5 to 30 carbon atoms. Examples of the substituent are the same as those of the substituent described later in the case where Z, $Y_1$, $Y_2$, $Y_3$ and $Y_4$ may further have a substituent.

The substituted or unsubstituted alkenyl group represented by Z is preferably an alkenyl group having from 2 to 30 carbon atoms. Examples of the substituent are the same as those of the substituent described later in the case where Z, $Y_1$, $Y_2$, $Y_3$ and $Y_4$ may further have a substituent.

The substituted or unsubstituted aralkyl group represented by Z is preferably an aralkyl group having from 7 to 30 carbon atoms. Examples of the substituent are the same as those of the substituent described later in the case where Z, $Y_1$, $Y_2$, $Y_3$ and $Y_4$ may further have a substituent.

The substituted or unsubstituted aryl group represented by Z is preferably an aryl group having from 6 to 30 carbon atoms. Examples of the substituent are the same as those of the substituent described later in the case where Z, $Y_1$, $Y_2$, $Y_3$ and $Y_4$ may further have a substituent.

The heterocyclic group represented by Z is preferably a 5-membered or 6-membered heterocyclic group, and the ring may be further fused with another ring and may be an aromatic heterocyclic ring or a non-aromatic heterocyclic ring.

The heterocyclic group represented by Z is exemplified below in the form of a heterocyclic ring by omitting the substitution position. The substitution position is not limited and, for example, pyridine may be substituted at its 2-position, 3-position, and 4-position. Examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. In particular, an aromatic heterocyclic group is preferred. Preferred examples thereof, when described in the same manner as above, include pyridine, pyrazine, pyrimidine, pyridazine, triazine, pyrazole, imidazole, benzimidazole, triazole, thiazole, benzothiazole, isothiazole, benzisothiazole, and thiadiazole.

These heterocyclic groups each may have a substituent, and examples of the substituent are the same as those of the substituent described later in the case where Z, $Y_1$, $Y_2$, $Y_3$ and $Y_4$ each may further have a substituent.

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group, or a sulfo group, and each group may further have a substituent.

Among these, preferred are a hydrogen atom, a halogen atom, an alkyl group, an aryl group, a cyano group, an alkoxy group, an amido group, a ureido group, a sulfonamido group, a carbamoyl group, an alkoxycarbonyl group, a carboxyl group, and a sulfo group, more preferred are a hydrogen atom, a halogen atom, a cyano group, a carboxyl group, and a sulfo group, and most preferred is a hydrogen atom.

In the case where $Y_1$, $Y_2$, $Y_3$, $Y_4$ and Z each is a group which may further have a substituent, each may further have the following substituent.

Examples of the substituent include a halogen atom (e.g., chlorine, bromine); a linear or branched alkyl group having a carbon number of 1 to 12, an aralkyl group having a carbon number of 7 to 18, an alkenyl group having a carbon number of 2 to 12, a linear or branched alkynyl group having a carbon number of 2 to 12, a cycloalkyl group having a carbon number of 3 to 12 which may have a side chain, a cycloalkenyl group having a carbon number of 3 to 12 which may have a side chain (specific examples of the above groups include methyl, ethyl, propyl, isopropyl, t-butyl, 2-methylsulfonylethyl, 3-phenoxypropyl, trifluoromethyl, and cyclopentyl); an aryl group (e.g., phenyl, 4-tert-butylphenyl, 2,4-di-t-amylphenyl); a heterocyclic group (e.g., imidazolyl, pyrazolyl, triazolyl, 2-furyl, 2-thienyl, 2-pyrimidinyl, 2-benzothiazolyl); an alkyloxy group (e.g., methoxy, ethoxy, 2-methoxyethoxy, 2-methylsulfonylethoxy); an aryloxy group (e.g., phenoxy, 2-methylphenoxy, 4-t-butylphenoxy, 3-nitrophenoxy, 3-t-butyloxycarbonylphenoxy, 3-methoxycarbonylphenoxy); an acylamino group (e.g., acetamido, benzamido, 4-(3-t-butyl-4-hydroxyphenoxy)butanamido); an alkylamino group (e.g., methylamino, butylamino, diethylamino, methylbutylamino); an anilino group (e.g., phenylamino, 2-chloroanilino); a ureido group (e.g., phenylureido, methylureido, N,N-dibutylureido); a sulfamoylamino group (e.g., N,N-dipropylsulfamoylamino); an alkylthio group (e.g., methylthio, octylthio, 2-phenoxyethylthio); an arylthio group (e.g., phenylthio, 2-butoxy-5-t-octylphenylthio, 2-carboxyphenylthio); an alkyloxycarbonylamino group (e.g., methoxycarbonylamino); a sulfonamido group (e.g., methanesulfonamido, benzenesulfonamido, p-toluenesulfonamido); a carbamoyl group (e.g., N-ethylcarbamoyl, N,N-dibutylcarbamoyl); a sulfamoyl group (e.g., N-ethylsulfamoyl, N,N-dipropylsulfamoyl, N,N-diethylsulfamoyl); a sulfonyl group (e.g., methylsulfonyl, octylsulfonyl, phenylsulfonyl, 4-methylphenylsulfonyl); an alkyloxycarbonyl group (e.g., methoxycarbonyl, butyloxycarbonyl); a heterocyclic oxy group (e.g., 1-phenyltetrazol-5-oxy, 2-tetrahydropyranyloxy); an azo group (e.g., phenylazo group, 4-methoxyphenylazo, 4-pivaloylaminophenylazo, 2-hydroxy-4-propanoylphenylazo); an acyloxy group (e.g., acetoxy); a carbamoyloxy group (e.g., N-methylcarbamoyloxy, N-phenylcarbamoyloxy); a silyloxy group (e.g., trimethylsilyloxy, dibutylmethylsilyloxy); an aryloxycarbonylamino group (e.g., phenoxycarbonylamino); an imido group (e.g., N-succinimido, N-phthalimido); a heterocyclic thio group (e.g., 2-benzothiazolylthio, 2,4-di-phenoxy-1,3,5-triazole-6-thio, 2-pyridylthio); a sulfinyl group (e.g., 3-phenoxypropylsulfinyl); a phosphonyl group (e.g., phenoxyphosphonyl, octyloxyphosphonyl, phenylphosphonyl); an aryloxycarbonyl group (e.g., phenoxycarbonyl); an acyl group (e.g., acetyl, 3-phenylpropanoyl, benzoyl); an ionic hydrophilic group (e.g., carboxyl, sulfo, quaternary ammonium, sulfonylsulfamoyl, and acylsulfamoyl groups); a cyano group, a hydroxy group, a nitro group, and an amino group. Among these substituents, preferred are a hydroxy group, an alkoxy group, a sulfamoyl group, a sulfonamido group, an acylamino group, a carbamoyl group, a cyano group, and an ionic hydrophilic group, and particularly preferred are a hydroxy group, a sulfamoyl group and an ionic hydrophilic group.

In formula (I), $a_1$ to $a_4$ and $b_1$ to $b_4$ represents the number of substituents $X_1$ to $X_4$ and $Y_1$ to $Y_4$, respectively, $a_1$ to $a_4$ each independently represents an integer of 0 to 4, and $b_1$ to $b_4$ each independently represents an integer of 0 to 4, provided that when $a_1$ to $a_4$ and $b_1$ to $b_4$ each is an integer of 2 or more, a plurality of each of $X_1$ to $X_4$ and $Y_1$ to $Y_4$ may be the same or different.

$a_1$ and $b_1$ satisfy the relationship of $a_1+b_1=4$ and each independently represents an integer of 0 to 4. A combination where $a_1$ represents 1 or 2 and $b_1$ represents 3 or 2 is particularly preferred, and a combination where $a_1$ represents 1 and $b_1$ represents 3 is most preferred.

$a_2$ and $b_2$ satisfy the relationship of $a_2+b_2=4$ and each independently represents an integer of 0 to 4. A combination where $a_2$ represents 1 or 2 and $b_2$ represents 3 or 2 is particularly preferred, and a combination where $a_2$ represents 1 and $b_2$ represents 3 is most preferred.

$a_3$ and $b_3$ satisfy the relationship of $a_3+b_3=4$ and each independently represents an integer of 0 to 4. A combination where $a_3$ represents 1 or 2 and $b_3$ represents 3 or 2 is particularly preferred, and a combination where $a_3$ represents 1 and $b_3$ represents 3 is most preferred.

$a_4$ and $b_4$ satisfy the relationship of $a_4+b_4=4$ and each independently represents an integer of 0 to 4. A combination where $a_4$ represents 1 or 2 and $b_4$ represents 3 or 2 is particularly preferred, and a combination where $a_4$ represents 1 and $b_4$ represents 3 is most preferred.

M represents a hydrogen atom, a metal element, a metal oxide, a metal hydroxide or a metal halide.

M is, other than a hydrogen atom, preferably a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as $Si(OH)_2$, $Cr(OH)_2$ and $Sn(OH)_2$, or a halide such as AlCl, $SiCl_2$, VCl, $VCl_2$, VOCl, FeCl, GaCl, or ZrCl, more preferably Cu, Ni, Zn, or Al, and most preferably Cu.

In the phthalocyanine compound represented by the general formula (1), Pc (phthalocyanine ring) may form a dimer (e.g., Pc-M-L-M-Pc) or a trimer through L (a divalent linking group), and at this time, a plurality of M's may be the same or different.

The divalent linking group represented by L is preferably an oxy group —O—, a thio group —S—, a carbonyl group —CO—, a sulfonyl group —$SO_2$—, an imino group —NH—, a methylene group —$CH_2$— or a group formed by combining these groups.

In the above general formula (I), the molecular weight of the phthalocyanine compound ranges preferably from 750 to 3,000, more preferably from 995 to 2,500, still more preferably from 995 to 2,000, and most preferably from 995 to 1,800.

In the case where Pc (phthalocyanine ring) of the phthalocyanine compound represented by the general formula (I) forms a dimer (e.g., Pc-M-L-M-Pc) or a trimer through L (a divalent linking group), the preferred molecular weight, for example, the most preferred molecular weight, is 2 times (in the case of dimer) or 3 times (in the case of trimer) the particularly preferred molecular weight described above.

In the phthalocyanine compound represented by the general formula (I), at least one of $X_1$, $X_2$, $X_3$, $X_4$, $Y_1$, $Y_2$, $Y_3$ and $Y_4$ is an ionic hydrophilic group or a group having an ionic hydrophilic group as a substituent.

Examples of the ionic hydrophilic group as a substituent include a sulfo group (—$SO_3^-X^+$), a carboxyl group (—$CO_2^-X^+$), a quaternary ammonium group (—$N^+RR'R''$ $X^-$), an acylsulfamoyl group (—$SO_2N^+X^-COR$), a sulfonylcarbamoyl group (—$CON^+X^-SO_2R$) and a sulfonylsulfamoyl group (—$SO_2N^+X^-SO_2R$). Among these, preferred are a sulfo group, a carboxyl group, and a quaternary ammonium group, particularly preferred is a sulfo group. The sulfo group, the carboxyl group, the acylsulfamoyl group, the sulfonylcarbamoyl group, and the sulfonylsulfamoyl group each may be in the state of a salt, and examples of the counter ion forming the salt include an alkali metal ion (e.g., a sodium ion, a potassium ion, or a lithium ion), an ammonium ion, an organic cation (e.g., a tetramethylguanidinium ion), and an organic and/or inorganic anion (e.g., a halogen ion, a methanesulfonate ion, a benzenesulfonate ion). Incidentally, X in the parenthesis above represents a hydrogen atom or a counter ion, and R, R', and R" each represents a substituent.

The phthalocyanine compound represented by the general formula (I) has good solubility or dispersibility in an aqueous solvent, because at least one ionic hydrophilic group or at least one group having an ionic hydrophilic group as a substituent is present in one molecule. From this standpoint, the phthalocyanine compound represented by the general formula (I) is preferably a compound having at least two ionic hydrophilic groups in one molecule, more preferably a compound wherein at least one of a plurality of the ionic hydrophilic groups is a sulfo group, and most preferably a compound having at least two sulfo groups in one molecule.

The compound particularly preferred as the phthalocyanine compound represented by the general formula (I) is a compound having a combination of the following (a) to (f):

(a) $X_1$ to $X_4$ each is independently preferably —$SO_2$—Z;

(b) each Z is independently a substituted or unsubstituted alkyl group, a substituted or unsubstituted aryl group, or a substituted or unsubstituted heterocyclic group, preferably a substituted alkyl group, a substituted aryl group, or a substituted heterocyclic group, and most preferably a substituted alkyl group;

(c) $Y_1$ to $Y_4$ each is independently preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group, or a sulfo group, more preferably a hydrogen atom, a halogen atom, a cyano group, a carboxyl group, or a sulfo group, and most preferably a hydrogen atom;

(d) $a_1$ to $a_4$ each is independently preferably 1 or 2, more preferably 1, and $b_1$ to $b_4$ each is independently preferably 3 or 2, more preferably 3;

(e) M is preferably Cu, Ni, Zn, or Al, and most preferably Cu; and (f) the molecular weight of the phthalocyanine compound ranges preferably from 750 to 3,000, more preferably from 995 to 2,500, still more preferably from 995 to 2,000, and most preferably from 995 to 1,800.

As for the preferred combination of substituents in the compound represented by the above general formula (I), a compound wherein at least one substituent of various substituents is a preferred group described above is preferred, a compound wherein a larger number of various substituents are a preferred group described above is more preferred, and a compound where all substituents are a preferred group described above is most preferred.

Among the phthalocyanine compounds represented by the general formula (I), a phthalocyanine compound having a structure represented by the general formula (III) shown below is preferred. The phthalocyanine compound represented by the general formula (III) for use in the invention will be described in detail below.

[Chem. 10]

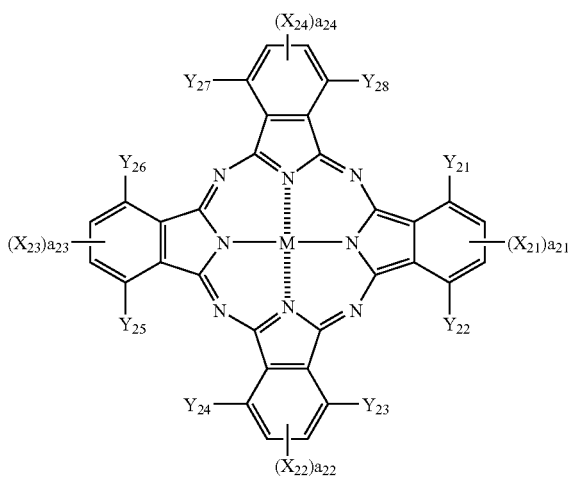

General Formula (III)

In the above general formula (III), $X_{21}$, $X_{22}$, $X_{23}$ and $X_{24}$ each independently represents either —SO—Z or —SO$_2$—Z, preferably —SO$_2$—Z.

Z has the same meaning as Z in the general formula (I), and preferred examples are also the same.

$Y_{21}$ to $Y_{28}$ each independently has the same meaning as $Y_1$, $Y_2$, $Y_3$ and $Y_4$ in formula (I), and preferred examples are also the same.

$a_{21}$ to $a_{24}$ satisfy $4 \leq a_{21}+a_{22}+a_{23}+a_{24} \leq 8$, preferably $4 \leq a_{21}+a_{22}+a_{23}+a_{24} \leq 6$, and each independently represents an integer of 1 or 2. It is particularly preferred that $a_{21}=a_{22}=a_{23}=a_{24}=1$.

M has the same meaning as M in the general formula (I).

At least one of $X_{21}$, $X_{22}$, $X_{23}$, $X_{24}$, $Y_{21}$, $Y_{22}$, $Y_{23}$, $Y_{25}$, $Y_{26}$, $Y_{27}$, and $Y_{28}$ is an ionic hydrophilic group or a group having an ionic hydrophilic group as a substituent.

Examples of the ionic hydrophilic group are the same as those for $X_1$, $X_2$, $X_3$ and $X_4$ in the general formula (I), and preferred examples are also the same.

The phthalocyanine compound represented by the general formula (III) has good solubility or dispersibility in an aqueous solvent, because at least one ionic hydrophilic group or at least one group having an ionic hydrophilic group as a substituent is present in one molecule. From this standpoint, the phthalocyanine compound represented by the general formula (III) is preferably a compound having at least two ionic hydrophilic groups in one molecule, more preferably a compound where at least one of a plurality of ionic hydrophilic groups is a sulfo group, and most preferably a compound having at least two sulfo groups in one molecule.

In the above general formula (III), the molecular weight of the phthalocyanine compound ranges preferably from 750 to 3,000, more preferably from 995 to 2,500, still more preferably from 995 to 2,000, and most preferably from 995 to 1,800.

However, in the case where Pc (phthalocyanine ring) of the phthalocyanine compound represented by the general formula (III) for use in the present invention forms a dimer (e.g., Pc-M-L-M-Pc) or a trimer through L (a divalent linking group), the preferred molecular weight, for example, the most preferred molecular weight, is 2 times (in the case of dimer) or 3 times (in the case of trimer) the most preferred molecular weight described above (from 995 to 1,800). Here, the preferred molecular weight of the dimer or trimer is a value including the linking group L.

The compound particularly preferred as the phthalocyanine compound represented by the general formula (III) is a compound having a combination of the following (a) to (f):

(a) $X_{21}$ to $X_{24}$ each is independently preferably —SO$_2$—Z;

(b) each Z is independently preferably a substituted or unsubstituted alkyl group, a substituted or unsubstituted aryl group, or a substituted or unsubstituted heterocyclic group, more preferably a substituted alkyl group, a substituted aryl group, or a substituted heterocyclic group, and most preferably a substituted alkyl group;

(c) $Y_{21}$ to $Y_{28}$ each is independently preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group, or a sulfo group, and most preferably a hydrogen atom;

(d) $a_{11}$ to $a_{14}$ each is independently preferably 1 or 2 and more preferably, $a_{11}=a_{12}=a_{13}=a_{14}=1$;

(e) M is preferably Cu, Ni, Zn or Al, and most preferably Cu; and (f) the molecular weight of the phthalocyanine compound ranges preferably from 750 to 2,500, more preferably from 995 to 2,500, still more preferably from 995 to 2,000, and most preferably from 995 to 1,800.

As for the preferred combination of substituents in the compound represented by the general formula (III), a compound wherein at least one substituent of various substituents is a preferred group described above is preferred, a compound wherein a larger number of various substituents are a preferred group described above is more preferred, and a compound wherein all substituents are a preferred group described above is most preferred.

Among the phthalocyanine compounds represented by the general formula (III), a phthalocyanine compound having a structure represented by the general formula (IV) shown below is preferred. The phthalocyanine compound represented by the general formula (IV) for use in the present invention will be described in detail below.

[Chem. 11]

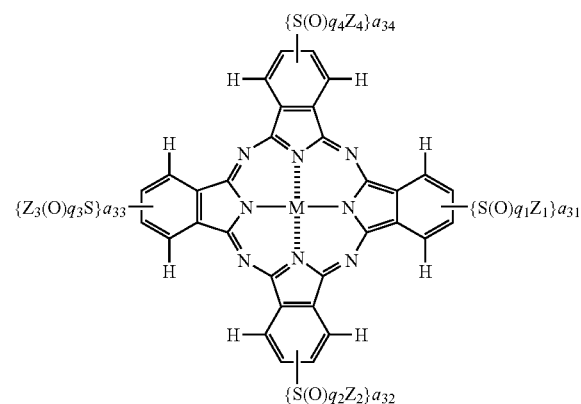

General Formula (IV)

In formula (IV), $Z_1$, $Z_2$, $Z_3$, and $Z_4$ each independently has the same meaning as Z in the general formula (I), and preferred examples are also the same.

$q_1$, $q_2$, $q_3$ and $q_4$ each independently represents an integer of 1 or 2, preferably 2, and most preferably $q_1=q_2=q_3=q_4=2$.

$a_{31}$, $a_{32}$, $a_{33}$ and $a_{34}$ each independently represents an integer of 1 or 2, preferably 1, and it is most preferred that $a_{31}=a_{32}=a_{33}=a_{39}=1$.

M has the same meaning as M in formula (I).

At least one of $Z_1$, $Z_2$, $Z_3$, and $Z_4$ has an ionic hydrophilic group as a substituent.

Examples of the ionic hydrophilic group are the same as those for Z in the above general formula (I), and preferred examples are also the same.

The molecular weight of the phthalocyanine compound ranges preferably from 750 to 2,500, more preferably from 995 to 2,500, still more preferably from 995 to 2,000, and most preferably from 995 to 1,800.

Among the phthalocyanine compounds represented by the general formula (I) for use in the present invention, a compound represented by the following general formula (II) is particularly preferred.

[Chem. 12]

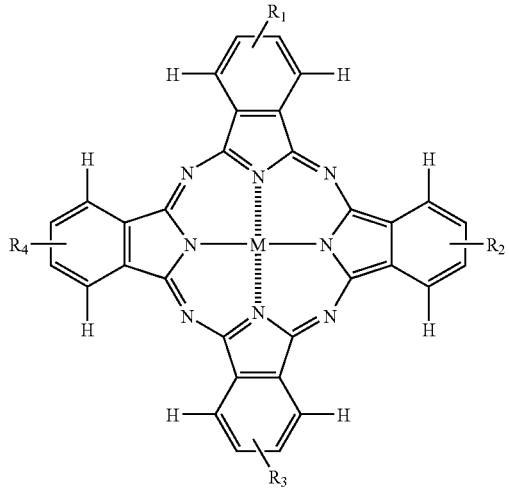

General Formula (II)

wherein M has the same meaning as in the general formula (I), $R_1$ to $R_4$ each independently represents —$SO_2Z$, and Z has the same meaning as in formula (I), with preferred examples thereof being also the same, provided that at least one of four Z's has an ionic hydrophilic group as a substituent.

Among these compounds, preferred is a compound where M in the general formula (II) is a copper element and Z an ionic hydrophilic group as a substituent is a sulfoalkyl group, and more preferred is a compound where the sulfo group is in the salt state and the counter cation forming the salt is a lithium cation.

The phthalocyanine compound represented by the general formula (V) shown below, which can be used in the present invention, is synthesized, for example, by reacting a metal derivative represented by M-(Y)d with a phthalonitrile compound represented by the general formula (VI) shown below and/or a diaminoisoindoline derivative represented by the general formula (VII) shown below. In the formulae, Z and $Z_1$ to $Z_4$ each has the same meaning as Z in the general formula (I), and M has the same meaning as M in the general formula (I). Y represents a monovalent or divalent ligand such as a halogen atom, an acetate anion, acetylacetonate, and oxygen, and d is an integer of 1 to 4. Examples of the metal derivative represented by M-(Y)d include a halide, a carboxylic acid derivative, a sulfate, a nitrate, a carbonyl compound, an oxide, and a complex of Al, Si, Ti, V, Mn, Fe, Co, Ni, Cu, Zn, Ge, Ru, Rh, Pd, In, Sn, Pt, and Pb. Specific examples thereof include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, acetylacetone manganese, manganese chloride, lead chloride, lead acetate, indium chloride, titanium chloride, and tin chloride.

[Chem. 13]

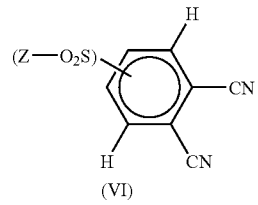

&/or

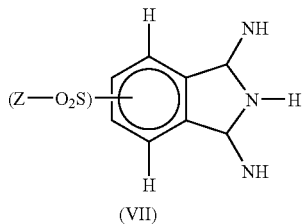

$\xrightarrow{M\text{-}(Y)_d}$

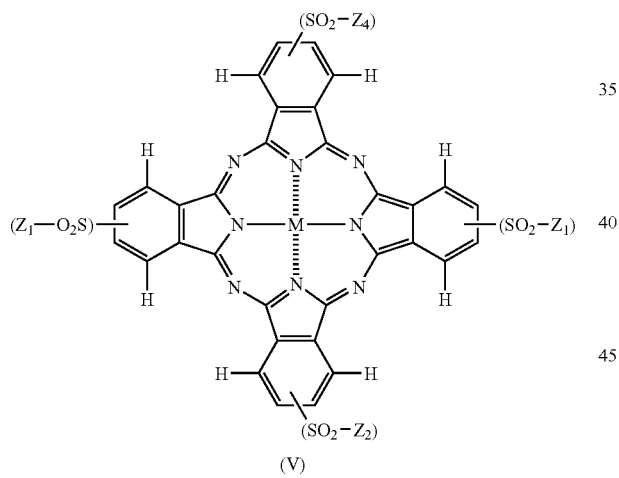

The thus obtained compound represented by the general formula (V) is usually a mixture of compounds represented by the general formulae (a)-1 to (a)-4 shown below, which are isomers with respect to the substitution positions of $R_1(SO_2-Z_1)$, $R_2(SO_2-Z_2)$, $R_3(SO_2-Z_3)$ and $R_4(SO_2-Z_4)$.

Furthermore, in the case of preparing a dye by using two or more different kinds of compounds represented by the general formula (VI) and/or the general formula (VII), which are different in substituent, the compound represented by the general formula (V) is a mixture of dyes different in kind and position of substituent.

[Chem. 14]

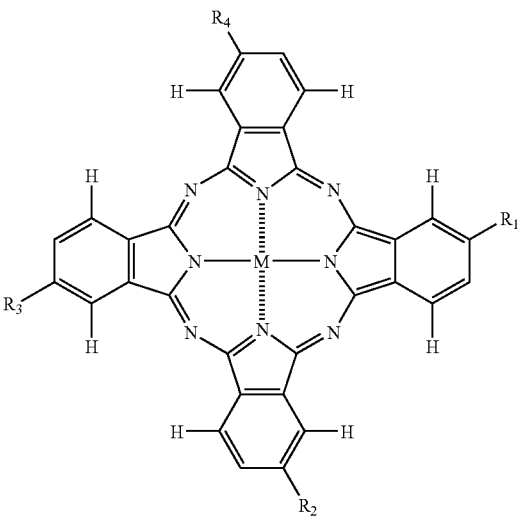

(a)-1

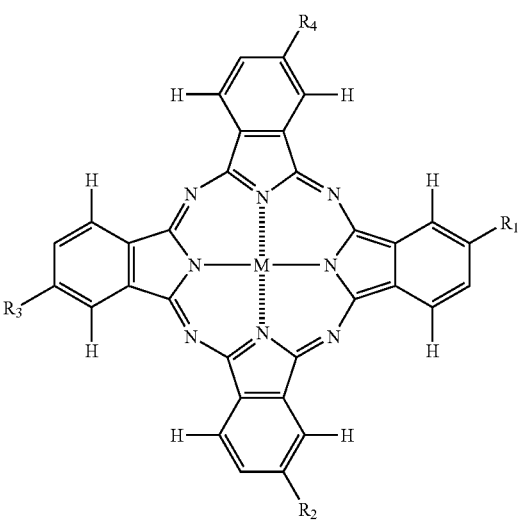

(a)-2

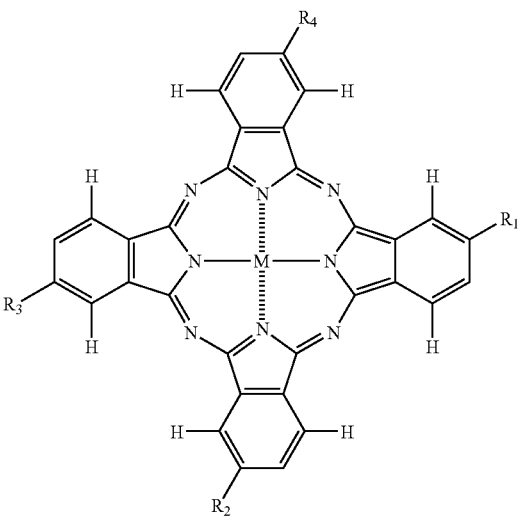

(a)-3

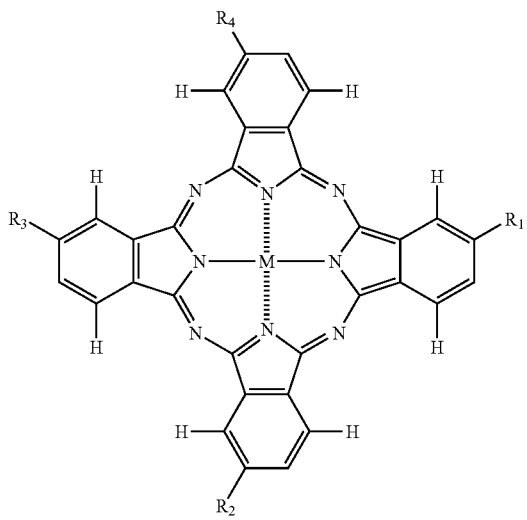

(a)-4

Examples of the cyan dye for use in the present invention include compounds having corresponding structures described in JP-A-2002-249677, JP-A-2003-213167, JP-A-2003-213168, and JP-A-2004-2670. Particularly preferred compounds are shown in Tables below. The compounds shown in Tables 7 and 8 can be synthesized by the methods described in these publications or in the specification. Of course, the starting compound, the dye intermediate, and the synthetic method are not limited to those described therein.

TABLE 7

In the general formula (V),

| | M | $Z_1$ | $Z_2$ | $Z_3$ | $Z_4$ |
|---|---|---|---|---|---|
| Compound A | Cu | —$(CH_2)_3SO_3Na$ | —$(CH_2)_3SO_3Na$ | —$(CH_2)_3SO_3Na$ | —$(CH_2)_3SO_3Na$ |
| Compound B | Cu | —$(CH_2)_3SO_3Li$ | —$(CH_2)_3SO_3Li$ | —$(CH_2)_3SO_3Li$ | —$(CH_2)_3SO_3Li$ |
| Compound C | Cu | —$(CH_2)_3CO_2K$ | —$(CH_2)_3CO_2K$ | —$(CH_2)_3CO_2K$ | —$(CH_2)_3CO_2K$ |
| Compound D | Cu | —$CH_2CH(OH)CH_2SO_3Li$ | —$CH_2CH(OH)CH_2SO_3Li$ | —$CH_2CH(OH)CH_2SO_3Li$ | —$CH_2CH(OH)CH_2SO_3Li$ |
| Compound E | Cu | —$(CH_2)_2CH(CH_3)SO_3Li$ | —$(CH_2)_2CH(CH_3)SO_3Li$ | —$(CH_2)_2CH(CH_3)SO_3Li$ | —$(CH_2)_2CH(CH_3)SO_3Li$ |

TABLE 8

In the following formula:

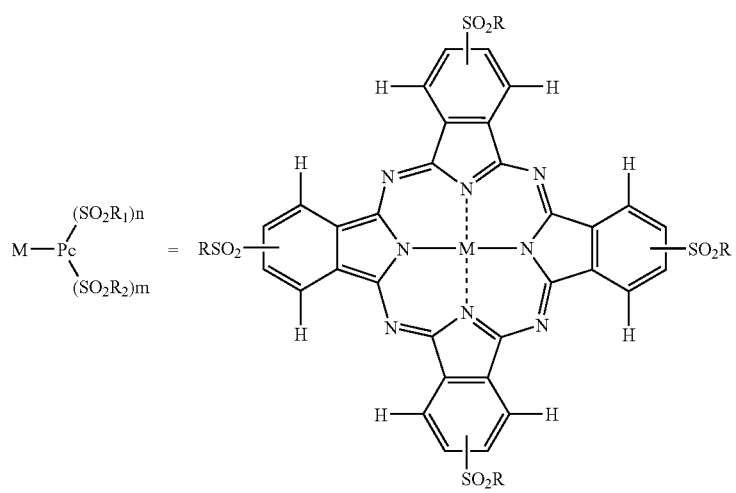

| | M | $R_1$ | n | $R_2$ | m |
|---|---|---|---|---|---|
| Compound F | Cu | —$(CH_2)_3SO_3Li$ | 3 | —$(CH_2)_3SO_2NHCH_2CH(OH)CH_3$ | 1 |
| Compound G | Cu | —$(CH_2)_3SO_3Li$ | 2 | —$(CH_2)_3SO_2NHCH_2CH(OH)CH_3$ | 2 |
| Compound H | Cu | —$(CH_2)_3SO_3Li$ | 3 | —$(CH_2)_3SO_2NHCH(OH)CH_2OH$ | 1 |
| Compound I | Cu | —$(CH_2)_3SO_3Li$ | 2 | —$(CH_2)_3SO_2NHCH(OH)CH_2OH$ | 2 |
| Compound J | Cu | —$(CH_2)_3SO_3Li$ | 3 | —$(CH_2)_3SO_2N(C_2H_4OH)_2$ | 1 |
| Compound K | Cu | —$(CH_2)_3SO_3Li$ | 3 | —$(CH_2)_6CO_2Li$ | 1 |

TABLE 8-continued

In the following formula:

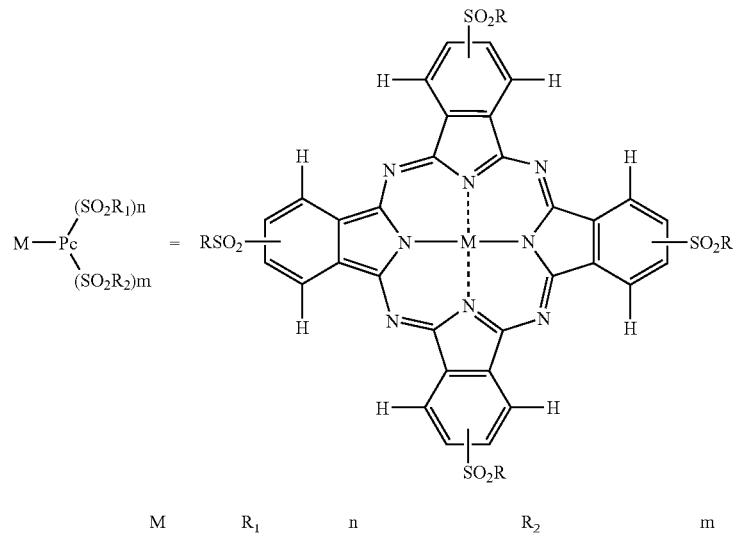

| M | R$_1$ | n | R$_2$ | m |

In the Table, the introduction position of substituents (SO$_2$R$_1$) and (SO$_2$R$_2$) is in random order.
(Isomers represented by formulae (a)-1 to (a)-4 are shown)
Values of m and n are charged molar ratios of phthalonitrile derivatives used in the synthesis of phthalocyanine derivative.

The following will describe embodiments common to or almost common to the invention according to the concept (A) and the invention according to the concept (B).

The ink composition of the invention contains at least one aromatic compound having a carboxyl group in order to weaken or eliminate the bronzing phenomenon as encountered in the solid printing or to improve moisture resistance of a printed matter.

The aromatic compound having a carboxyl group for use in the invention may be any compound as far as it is an aromatic compound having at least one carboxyl group in the molecular structure, but an aromatic compound having at least one carboxyl group in a naphthalene skeleton is preferred. Furthermore, a compound having a carboxyl group at its 2-position and having a naphthalene skeleton is more preferred.

Moreover, as a preferable embodiment, there may be mentioned incorporation of the aromatic compound having a carboxyl group as an alkali metal salt and/or an ammonium salt or incorporation thereof together with a hydroxide of an alkali metal and/or ammonia as a neutralizing agent (herein, an alkali metal salt or an ammonium salt of the aromatic compound having a carboxyl group is also included in the aromatic compound having a carboxyl group). Among alkali metal salts thereof, a lithium salt is particularly preferred not only in view of bronzing resistance but also in view of clogging resistance in a capped state. A sodium salt and a potassium salt among alkali metal salts or an ammonium salt thereof are preferred in view of clogging resistance in a non-capped state.

Specific examples of the aromatic compound having a carboxyl group include 1-naphthoic acid, 2-naphthoic acid, 2-hydroxy-1-naphthoic acid, 1-hydroxy-2-naphthoic acid, 3-hydroxy-2-naphthoic acid, 6-hydroxy-2-naphthoic acid, 4-hydroxybenzoic acid, 2,6-naphthalenedicarboxylic acid, 3-methoxy-2-naphthoic acid, 3-ethoxy-2-naphthoic acid, 3-propoxy-2-naphthoic acid, 6-methoxy-2-naphthoic acid, 6-ethoxy-2-naphthoic acid, and 6-propoxy-2-naphthoic acid.

The content of the aromatic compound having a carboxyl group ranges from 0.1 to 10% by weight, preferably from 0.5 to 5% by weight, based on the total weight of the ink composition, though this content is determined according to the kind of the aromatic compound having a carboxyl group, the kind of the dye, the kind of the solvent component, or the like.

In the ink composition of the invention, the content ratio of the dye and the aromatic compound having a carboxyl group ranges preferably from 1:0.2 to 1:10, more preferably from 1:0.3 to 1:6. When the ratio of the aromatic compound having a carboxyl group and/or a salt thereof is higher than 1:0.1, a sufficiently high effect of improving the bronzing phenomenon and moisture resistance owing to the compound can be obtained, and when the ratio of the aromatic compound having a carboxyl group and/or a salt thereof is lower than 1:10, clogging reliability and the like can be easily ensured.

The ink composition of the invention contains a lithium ion. The lithium ion may be incorporated by adding the aromatic compound having a carboxyl group as a lithium salt or may be incorporated by using the colorant as a lithium salt (or a partial salt), or may be incorporated by separately adding a lithium compound such as lithium hydroxide as a neutralizing agent.

In the invention according to the concept (A), the concentration of the lithium ion in the ink composition is preferably from 0.001 to 0.1 mol in 100 g of the ink composition. Moreover, in the invention according to the concept (B), with regard to the content of the lithium ion in the ink composition, the number of moles of the lithium ion is preferably 1.2 times or more, more preferably from 1.4 to 3.0 times the number of moles of the sulfoalkyl group having an ionic hydrophilic group of the above cyan dye. In the invention of either concept, the anti-bronzing effect of the aromatic compound having a carboxyl group is enhanced and clogging reliability in a capped state becomes better by the presence of the lithium ion in the ink composition. Moreover, in the case that a lithium ion is combined with the —SO$_3$⁻ group in the colorant, the solubility of the colorant is enhanced.

With regard to at least one member selected from the group consisting of an sodium ion, a potassium ion, and an ammonium ion in the invention according to the concept (A) and a cation such as a sodium ion and/or a potassium ion according to the concept (B), as the above lithium ion, the aromatic compound having a carboxyl group or the colorant may be added as a sodium salt, a potassium salt, or an ammonium salt or a compound such as sodium hydroxide, potassium hydroxide, or ammonia may be separately added.

In the case that an ink nozzle is placed under severer conditions (e.g., in the case that a printing head is not returned to the home position when power supply is discontinued during printing and thus the nozzle is left without capping), the above cation can exhibit an effect of preventing clogging and ink droplet deflection caused by precipitation of the lithium salt of the aromatic compound having a carboxyl group and can provide an ink composition wherein reliability of clogging and the like is further enhanced without lowering the other properties. It is considered that this is attributable to higher solubility in the case that the above cation is combined with the —COO— group as compared with the case that a lithium ion is combined therewith.

In the invention according to the concept (A), the molar ratio of the total of at least one member selected from the group consisting of a sodium ion, a potassium ion and an ammonium ion relative to the lithium ion is preferably from 8:1 to 1:1, more preferably from 6:1 to 10:9. In the invention according to the concept (B), with regard to the content of the sodium ion and/or the potassium ion, the number of moles of the total of the sodium ion and the potassium ion is preferably 0.7 time or less, more preferably from 0.1 to 0.6 time the number of moles of the sulfoalkyl group having an ionic hydrophilic group of the above cyan dye. When the ions are used in the above range, the precipitation of a lithium salt can be prevented without lowering the anti-bronzing effect of the ink composition.

In the ink composition of the invention according to the concept (A), the molar ratio of the total of the lithium ion, the sodium ion, the potassium ion and the ammonium ion relative to the aromatic compound having a carboxyl group is preferably from 1:5 to 10:8, more preferably from 1:4 to 1:1. By incorporating the alkali metal ions in such a ratio, clogging resistance can be ensured both under usual conditions and under severer conditions and also ink resistance of parts of an ink cartridge (prevention of elution of the member into the ink composition, and the like) can be maintained.

Moreover, in the ink composition of the invention according to the concept (B), the total number of moles of sodium and potassium is preferably 0.3 time, more preferably from 0.4 to 1.0 time the number of moles of the carboxyl group of the above aromatic compound having a carboxyl group. By incorporating sodium and/or potassium in such a ratio, the solubility of the aromatic compound having a carboxyl group can be enhanced and the precipitation of the lithium salt can be prevented.

In order to stably dissolve a predetermined amount of the dye and a predetermined amount of the aromatic compound having a carboxyl group and/or a salt thereof, the pH (20° C.) of the ink composition is preferably 7.5 or higher. Also, considering the material resistance against various members with which the ink composition comes into contact, the pH of the ink composition is preferably 10.0 or lower. In order to more successfully attain both the stable dissolution and the material resistance, the pH of the ink composition is more preferably adjusted to the range of from 8.0 to 9.5.

Particularly, in the invention according to the concept (B), in order to ensure such a pH, the total number of moles of the lithium ion, the sodium ion, the potassium ion is preferably from 0.8 to 1.2 times the total number of moles of the carboxyl group of the aromatic compound having a carboxyl group.

Moreover, there is a case that the total number of moles of the lithium ion, the sodium ion, the potassium ion exceeds the above range while the pH is ensured (e.g., the ratio is made 1.2 times or more by adding NaCl, KCl, or the like), but the case is not preferred because the solubility of the dye is decreased when excessive ions are dissolved in the ink.

When urea is further added to the ink composition of the invention, the effect of preventing the generation of clogging and ink droplet deflection of ink nozzles under severe conditions is further enhanced. Urea also has an effect of preventing the precipitation of the lithium salt of the aromatic compound having a carboxyl group. The concentration of urea in the ink composition is preferably from 1 to 6% by weight, more preferably from 1.5 to 5.5% by weight. By using urea in this range, the generation of the lithium salt is effectively prevented and does not deteriorate clogging resistance. Moreover, the combination with the aromatic compound having a carboxyl group also exhibits an effect of further improving bronzing resistance.

The ink composition of the invention may further contain a humectant selected from a water-soluble organic solvent having a vapor pressure smaller than that of pure water and/or saccharides.

By virtue of containing a humectant, the evaporation of water can be suppressed and the ink can retain moisture in the ink jet recording system. Also, when the humectant is a water-soluble organic solvent, the ejection stability may be improved or the viscosity may be easily varied without causing any change in the ink properties.

The water-soluble organic solvent means a medium having an ability of dissolving a solute and is selected from water-soluble organic solvents having a vapor pressure smaller than that of water. Specifically, desired are polyhydric alcohols such as ethylene glycol, propylene glycol, butanediol, pentanediol, 2-butene-1,4-diol, 2-methyl-2,4-pentanediol, glycerin, 1,2,6-hexanetriol, diethylene glycol, triethylene glycol, and dipropylene glycol; ketones such as acetonylacetone; esters such as γ-butyrolactone and triethyl phosphate; a furfuryl alcohol, a tetrahydrofurfuryl alcohol, and a thiodiglycol.

Moreover, preferred examples of the saccharides include maltitol, sorbitol, gluconolactone and maltose.

The humectant is preferably added in an amount of 5 to 50% by weight, more preferably from 5 to 30% by weight, still more preferably from 5 to 20% by weight, based on the total amount of the ink composition. When the amount added thereof is 5% by weight or more, moisture retentivity can be obtained, and when it is 50% by weight or less, the viscosity can be easily adjusted to a viscosity for use in the ink jet recording.

The ink composition of the invention preferably comprises a nitrogen-containing organic solvent as the solvent. Examples of the nitrogen-containing organic solvent include 1,3-dimethyl-2-imidazolidinone, 2-pyrrolidone, N-methyl-2-pyrrolidone, and ε-caprolactam. Among these, 2-pyrrolidone can be suitably used. They may be used singly or two or more thereof may be used in combination.

The content thereof is preferably from 0.5 to 10% by weight, more preferably from 1 to 5% by weight. When the content thereof is 0.5% by weight or more, the solubility of the colorant in the invention can be improved by the addition, and when it is 10% by weight or less, the material resistance against various members with which the ink composition comes into contact is not worsened.

Furthermore, the ink composition of the invention preferably contains a nonionic surfactant as an additive effective for obtaining rapid fixing (penetrability) of the ink and also maintaining the circularity of one dot.

Examples of the nonionic surfactant for use in the invention include an acetylene glycol-based surfactant. Specific examples of the acetylene glycol-based surfactant include Surfynol 465, Surfynol 104 (trade names, both are manufactured by Air Products and Chemicals, Inc.), Olfine STG and Olfine E0101 (trade names, both are manufactured by Nisshin Chemical Industry Co.). The amount added thereof is from 0.1 to 5% by weight, preferably from 0.5 to 2% by weight. When the amount added thereof is 0.1% by weight or more, sufficiently high penetrability can be obtained, and when it is 5% by weight or less, generation of image blurring can be easily prevented.

In addition to the nonionic surfactant, by adding a glycol ether as a penetration accelerator, penetrability is more enhanced and on performing color printing, bleeding at the boundary between adjacent color inks is reduced and a very sharp image can be obtained.

Examples of the glycol ether usable in the invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The amount of the glycol ether added is from 3 to 30% by weight, preferably from 5 to 15% by weight. When the amount added thereof is less than 3% by weight, the effect of preventing the bleeding cannot be obtained, whereas when it exceeds 30% by weight, not only image blurring is generated but also oily separation occurs and a dissolution aid such as a glycol ether is required and, as a result, the viscosity of the ink is increased and it becomes difficult for the ink to be ejected from the ink jet head.

Furthermore, a pH adjusting agent such as triethanolamine or a hydroxide of an alkali metal, a hydrotropy agent such as urea or a derivative thereof, a water-soluble polymer such as sodium alginate, a water-soluble resin, a fluorine-containing surfactant, an antifungal agent, a rust inhibitor, and the like may be added to the ink composition of the present invention, if desired.

A method for preparing the ink composition of the invention may be, for example, a method of thoroughly mixing and dissolving respective components, filtering the resulting solution under pressure through a membrane filter having a pore diameter of 0.8 μm, and subsequently subjecting the filtrate to a deaeration treatment by means of a vacuum pump.

The recording method of the invention using the above-mentioned ink composition will be described below. With regard to the recording method of the invention, an ink jet recording system, wherein the ink composition is ejected in the form of liquid droplets from fine orifices and the liquid droplets are attached onto a recording medium to thereby perform the recording, can be suitably used. However, the recording method is, of course, usable also for applications such as general writing tools, recorders, and pen plotters.

As for the ink jet recording system, any conventionally known system can be employed. Particularly, excellent image recording can be performed by a method wherein liquid droplets are ejected by using vibration of a piezoelectric element (a recording method using an ink jet head which forms an ink droplet by mechanical deformation of an electrostrictive element), or by a method using heat energy.

The present invention will be illustrated in greater detail with reference to the following Examples and Comparative Examples.

However, the invention should not be construed as being limited to the following Examples.

Examples 1 to 11 and Comparative Examples 1 to 8

Each of ink compositions of Examples 1 to 11 and Comparative Examples 1 to 8 was prepared by mixing and dissolving respective components at a blending ratio shown in Table 9 and filtering the resulting solution under pressure through a membrane filter having a pore diameter of 1 μm. Each component of the ink compositions shown in Table 9 is represented as % by weight of each component relative to the total amounts of the ink compositions. In this connection, M Dye 1 in Table 9 is a compound represented by the following formula (6).

Formula (6)

[Chem. 15]

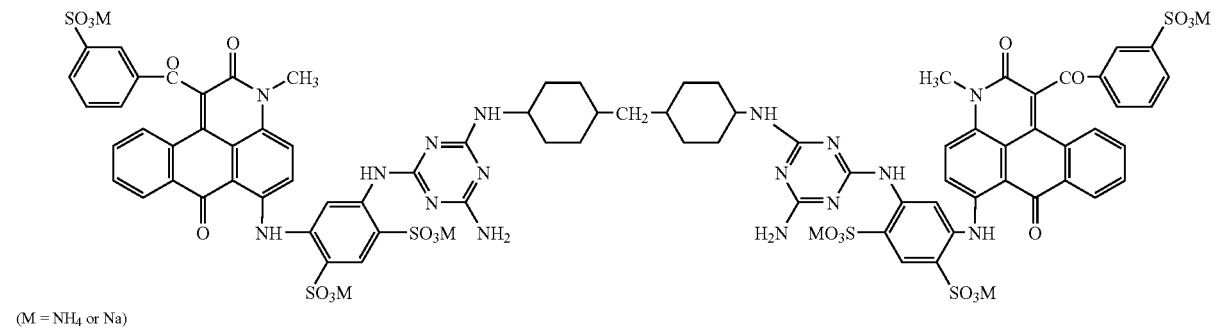

(M = NH₄ or Na)

wherein M represents NH₄ or Na and NH₄:Na=1:1 (molar ratio).

Moreover, M Dye 2 is the compound of Dye 8 in Table 3, Comparative Dye 1 is C. I. Direct Red 227, and Comparative Dye 2 is C. I. Acid Red 249. The number of moles of Li, the number of moles of Na⁺ K⁺ NH₃, the ratio of the number of moles of Na⁺ K⁺ NH₃ to the number of moles of the carboxyl group of 2-naphthoic acid, the ratio of the number of moles of Li to the number of moles of Na⁺ K⁺ NH₃, the number of moles of Na⁺ K⁺ NH₃, and the weight ratio of 2-naphthoic acid to the colorant are as shown in Table 10.

TABLE 9

| | M Dye 1 | M Dye 2 | Compara. Dye 1 | Compara. Dye 2 | 2-Naphthoic acid | LiOH•N2O | NaOH | NH₃ | Urea |
|---|---|---|---|---|---|---|---|---|---|
| Example 1 | 3.00 | | | | 2.00 | 0.48 | | | |
| Example 2 | | 3.00 | | | 3.00 | 0.72 | | | |
| Example 3 | | 3.00 | | | 3.00 | 0.72 | | | 0.50 |
| Example 4 | | 3.00 | | | 3.00 | 0.72 | | | 8.00 |
| Example 5 | | 3.00 | | | 3.00 | 2.10 | 1.30 | | 3.00 |
| Example 6 | | 3.00 | | | 5.00 | 0.50 | | | 3.00 |
| Example 7 | | 3.00 | | | 3.00 | 0.45 | 0.25 | | 3.00 |
| Example 8 | | 3.00 | | | 3.00 | 0.45 | | 0.11 | 3.00 |
| Example 9 | | 3.00 | | | 3.00 | 0.10 | | | 3.00 |
| Example 10 | | 3.00 | | | 3.00 | 3.60 | | | 3.00 |
| Example 11 | | 3.00 | | | 3.00 | 0.72 | | | 3.00 |
| Comparative Example 1 | 3.00 | | | | | | | | |
| Comparative Example 2 | | 3.00 | | | | | | | |
| Comparative Example 3 | | | 3.00 | | | | | | |
| Comparative Example 4 | | | | 3.00 | | | | | |
| Comparative Example 5 | 3.00 | | | | 2.00 | 0.45 | | | |
| Comparative Example 6 | | 3.00 | | | 3.00 | 0.70 | | | |
| Comparative Example 7 | 3.00 | | | | 2.00 | 0.45 | | | 3.00 |
| Comparative Example 8 | | 3.00 | | | 3.00 | 0.70 | | | 3.00 |

| | Glycerin | Triethylene glycol monobutyl ether | Triethylene glycol | triethanol-amine | Olfin E1010 | Water | Total |
|---|---|---|---|---|---|---|---|
| Example 1 | 10.00 | 10.00 | 6.00 | 0.50 | 0.80 | 67.22 | 100.00 |
| Example 2 | 10.00 | 10.00 | 5.00 | 0.50 | 0.80 | 66.98 | 100.00 |
| Example 3 | 10.00 | 10.00 | 4.80 | 0.50 | 0.80 | 66.68 | 100.00 |
| Example 4 | 10.00 | 10.00 | 1.50 | 0.50 | 0.80 | 62.48 | 100.00 |
| Example 5 | 10.00 | 10.00 | 3.00 | 0.50 | 0.80 | 63.30 | 100.00 |
| Example 6 | 10.00 | 10.00 | 1.00 | 0.50 | 0.80 | 66.20 | 100.00 |
| Example 7 | 10.00 | 10.00 | 3.00 | 0.50 | 0.80 | 66.00 | 100.00 |
| Example 8 | 10.00 | 10.00 | 3.00 | 0.50 | 0.80 | 66.14 | 100.00 |
| Example 9 | 10.00 | 10.00 | 3.00 | 0.50 | 0.80 | 66.60 | 100.00 |
| Example 10 | 10.00 | 10.00 | 3.00 | 0.50 | 0.80 | 63.10 | 100.00 |
| Example 11 | 10.00 | 10.00 | 3.00 | 0.50 | 0.80 | 65.98 | 100.00 |
| Comparative Example 1 | 10.00 | 10.00 | 8.00 | 0.50 | 0.80 | 67.70 | 100.00 |
| Comparative Example 2 | 10.00 | 10.00 | 8.00 | 0.50 | 0.80 | 67.70 | 100.00 |
| Comparative Example 3 | 10.00 | 10.00 | 8.00 | 0.50 | 0.80 | 67.70 | 100.00 |
| Comparative Example 4 | 10.00 | 10.00 | 8.00 | 0.50 | 0.80 | 67.70 | 100.00 |
| Comparative Example 5 | 10.00 | 10.00 | 6.00 | 0.50 | 0.80 | 67.25 | 100.00 |
| Comparative Example 6 | 10.00 | 10.00 | 5.00 | 0.50 | 0.80 | 67.00 | 100.00 |
| Comparative Example 7 | 10.00 | 10.00 | 4.00 | 0.50 | 0.80 | 66.25 | 100.00 |
| Comparative Example 8 | 10.00 | 10.00 | 3.00 | 0.50 | 0.80 | 66.00 | 100.00 |

The numeral values in the table are shown in terms of % by weight.
Olfin E1010: trade name, manufactured by Nisshin Chemical Industry Co.

TABLE 10

| | Li (number of moles) | Na + K + NH₃ (number of moles) | Li + Na + K + NH₃ (number of moles)/2-naphthoic acid carboxyl group (number of moles) | Li (number of moles)/ Na + K + NH₃ (number of moles) | Li + Na + K + NH₃ (number of moles) | 2-naphthoic acid/colorant (% by weight) |
|---|---|---|---|---|---|---|
| Example 1 | 0.011 | 0.009 | 1.787 | 1.228 | 0.021 | 0.667 |
| Example 2 | 0.017 | 0.010 | 1.533 | 1.797 | 0.027 | 1.000 |

TABLE 10-continued

|  | Li (number of moles) | Na + K + NH₃ (number of moles) | Li + Na + K + NH₃ (number of moles)/2-naphthoic acid carboxyl group (number of moles) | Li (number of moles)/ Na + K + NH₃ (number of moles) | Li + Na + K + NH₃ (number of moles) | 2-naphthoic acid/colorant (% by weight) |
|---|---|---|---|---|---|---|
| Example 3 | 0.017 | 0.010 | 1.533 | 1.797 | 0.027 | 1.000 |
| Example 4 | 0.017 | 0.010 | 1.533 | 1.797 | 0.027 | 1.000 |
| Example 5 | 0.050 | 0.042 | 5.286 | 1.190 | 0.092 | 1.000 |
| Example 6 | 0.012 | 0.010 | 0.739 | 1.248 | 0.021 | 1.667 |
| Example 7 | 0.011 | 0.016 | 1.522 | 0.679 | 0.027 | 1.000 |
| Example 8 | 0.011 | 0.016 | 1.535 | 0.669 | 0.027 | 1.000 |
| Example 9 | 0.002 | 0.010 | 0.685 | 0.250 | 0.012 | 1.000 |
| Example 10 | 0.086 | 0.010 | 5.472 | 8.984 | 0.095 | 1.000 |
| Example 11 | 0.017 | 0.010 | 1.533 | 1.797 | 0.027 | 1.000 |
| Comparative Example 1 | 0 | 0.009 | — | 0 | 0.009 | 0 |
| Comparative Example 2 | 0 | 0.010 | — | 0 | 0.010 | 0 |
| Comparative Example 3 | — | — | — | — | — | 0 |
| Comparative Example 4 | — | — | — | — | — | 0 |
| Comparative Example 5 | 0 | 0.021 | 1.771 | 0 | 0.021 | 0.667 |
| Comparative Example 6 | 0 | 0.027 | 1.552 | 0 | 0.027 | 1.000 |
| Comparative Example 7 | 0 | 0.021 | 1.771 | 0 | 0.021 | 0.667 |
| Comparative Example 8 | 0 | 0.027 | 1.552 | 0 | 0.027 | 1.000 |

Printing for Recorded Matter

The ink compositions of Examples 1 to 10 and Comparative Examples 1 to 8 shown in Table 9 each was filled in a special cartridge (magenta chamber) using an ink jet printer Stylus Color 880 (trade name, manufactured by Seiko Epson Corporation) and printing and evaluation were performed on an ink jet special recording medium (PM photographic paper; produced by Seiko Epson Corporation, Model No.; KA420PSK) as follows.

Evaluation of Light Fastness

Using the cartridge filled with each of the ink compositions of Examples 1 and 2 and Comparative Examples 1 to 4, printing was performed while adjusting the applied duty to give an OD (optical density) value falling within the range from 0.9 to 1.1 for each ink composition. After left standing in a normal temperature and normal humidity environment without direct sunlight for one day, the recorded matter obtained was evaluated on light fastness under the following conditions.

Using a fluorescent light weather meter SFT-II (manufactured by Suga Test Instruments Co., Ltd.), the recorded matter was irradiated under the conditions of 24° C. and 60% RH at a luminance of 70,000 lux for 11 days.

An OD (optical density) value of the exposed sample was measured by a reflective densitometer ("Spectrolino", manufactured by Gretag). By substituting each measured value into the following equation, the relict optical density (ROD) after color fading was obtained.

$$ROD(\%) = (D_n/D_0) \times 100$$

wherein $D_n$: OD after irradiation test, $D_0$: OD before irradiation test.

A: ROD (%) is 85% or more.

B: ROD (%) is from 70% to less than 85%.

C: ROD (%) is from 55% to less than 70%.

D: ROD (%) is less than 55%.

The results of the evaluation are shown in Table 11.

Evaluation of Gas Resistance (Ozone Resistance)

Using the cartridge filled with each of the ink compositions of Examples 1 and 2 and Comparative Examples 1 to 4, printing was performed while adjusting the applied duty to give an OD (optical density) value falling within the range from 0.9 to 1.1 for each ink composition. After left in a normal temperature and normal humidity environment without direct sunlight for one day, the recorded matter obtained was evaluated on ozone resistance under the following conditions.

Using an ozone weather meter Model OMS-H (manufactured by Suga Test Instruments Co., Ltd.), the recorded matter was exposed under the conditions of 24° C. and 60% RH and an ozone concentration of 10 ppm for 24 hours.

An OD (optical density) value of the exposed sample was measured by a reflective densitometer ("Spectrolino", manufactured by Gretag). By substituting each measured value into the following equation, the relict optical density (ROD) after color fading was obtained.

$$ROD(\%) = (D_n/D_0) \times 100$$

wherein $D_n$: OD after irradiation test, $D_0$: OD before irradiation test.

A: ROD (%) is 85% or more.

B: ROD (%) is from 70% to less than 85%.

C: ROD (%) is from 55% to less than 70%.

D: ROD (%) is less than 55%.

The results of the evaluation are shown in Table 11.

Evaluation of Moisture Resistance

Using the cartridge filled with each of the ink compositions of Examples 1 and 2 and Comparative Examples 1 to 4, a character and an outline character were printed under the ejection conditions of giving a charged amount of 1.5 to 2.2 mg per 1 inch-square. The resulting printed matter was dried for 24 hours in an environment of 25° C. and 40% RH and then left standing in an environment of 40° C. and 85% RH for 3 days. Then, bleeding of dye (filling of the outline character) was visually confirmed and moisture resistance thereof was evaluated according to the following criteria. The results thereof are shown in Table 11.

A: Bleeding of dye is hardly observed.

B: Slight bleeding of dye and slight collapse of character outline are observed.

C: Bleeding of dye and collapse of character outline are observed.

D: Bleeding of dye, thickening of character and entire staining of outline character are observed.

Evaluation of Clogging Property (with Cap)

Using the cartridge filled with each of the ink compositions of Examples 1 to 10 and Comparative Examples 5 to 8, printing was continued for 10 minutes. After normal ejection was confirmed for all nozzles, they were left standing in an environment of 60° C. and 15% RH for 4 weeks. After the standing, cleaning operations were repeated until all the nozzles ejected inks equally to their initial state and aptness to restoration was evaluated. The results thereof are shown in Table 12.

A: Nozzles are restored equally to initial state by performing the cleaning operation from 1 to 4 times.

B: Nozzles are restored equally to initial state by performing the cleaning operation from 5 to 8 times.

C: Nozzles are restored equally to initial state by performing the cleaning operation from 9 to 12 times.

D: Nozzles are not restored even by performing the cleaning operation within practical number of times.

Evaluation of Clogging Property (without Cap)

(Restoration from Clogging)

Using the cartridge filled with each of the ink compositions of Examples 1 to 10, printing was continued for 10 minutes. After normal ejection was confirmed for all nozzles, the recording head was left standing with removing the head cap in an environment of 40° C. and 20% RH for 1 week or 2 weeks. After the standing, cleaning operations were repeated until all the nozzles ejected inks equally to their initial state and aptness to restoration was evaluated. The results thereof are shown in Table 13.

A: Nozzles are restored equally to initial state by performing the cleaning operation from 1 to 4 times.

B: Nozzles are restored equally to initial state by performing the cleaning operation from 5 to 8 times.

C: Nozzles are restored equally to initial state by performing the cleaning operation from 9 to 12 times.

D: Nozzles are not restored even by performing the cleaning operation within practical number of times.

(Ink Droplet Deflection)

Using the above printer restored from the clogging, a solid pattern was printed at a duty of 40%. According to the following criteria, judgment was visually performed. The results thereof are shown in Table 13.

A: The solid pattern is filled and no change is observed as compared with the initial state.

B: Slight change is observed as compared with the initial state.

C: The solid pattern is not filled and many streaks are observed.

Ink Resistance of Parts

Ten grams of polypropylene pellets (manufactured by Mitsui Chemicals Inc., Mitsui Polypro™ J105G) were immersed in 20 g of each of the ink compositions of Examples 1 to 10 and stored at 70° C. for 5 days or 10 days. After the storage, the pellets were left standing at 5° C. for 3 days and floating foreign matter was visually confirmed.

A: No floating foreign matter.

B: Presence of a small amount of floating foreign matter.

C: Presence of a large amount of floating foreign matter.

The results thereof are shown in table 13.

TABLE 11

|  | Light fastness | Gas resistance | Moisture resistance |
|---|---|---|---|
| Example 1 | B | A | B |
| Example 2 | A | B | B |
| Comparative Example 1 | B | A | D |
| Comparative Example 2 | A | B | D |
| Comparative Example 3 | D | D | A |
| Comparative Example 4 | D | D | D |

TABLE 12

Clogging Resistance (with cap)

|  | Result |
|---|---|
| Example 1 | A |
| Example 2 | A |
| Example 3 | A |
| Example 4 | C |
| Example 5 | B |
| Example 6 | C |
| Example 7 | C |
| Example 8 | C |
| Example 9 | C |
| Example 10 | B |
| Example 11 | B |
| Comparative Example 5 | D |
| Comparative Example 6 | D |
| Comparative Example 7 | D |
| Comparative Example 8 | D |

TABLE 13

Clogging resistance (without cap)

|  | Restoration | | Ink droplet deflection | | Ink resistance of parts | |
|---|---|---|---|---|---|---|
|  | 1 week | 2 weeks | 1 week | 2 weeks | 5 days | 10 days |
| Example 1 | A | A | B | C | A | A |
| Example 2 | A | A | B | C | A | A |
| Example 3 | A | A | B | C | A | A |
| Example 4 | B | C | A | A | A | B |
| Example 5 | A | A | A | A | B | C |
| Example 6 | A | B | A | B | A | A |
| Example 7 | A | B | A | A | A | A |
| Example 8 | A | B | A | A | A | A |
| Example 9 | B | C | A | B | A | A |
| Example 10 | A | A | A | A | A | C |
| Example 11 | A | A | A | A | B | A |

In the evaluation on image fastness shown in Table 11, light fastness and gas resistance are poor in Comparative Example 3 wherein Comparative Dye 1 is used and poor results are observed for all the items in Comparative Example 4 wherein Comparative Dye 2 is used. Moreover, the ink compositions of Examples 1 and 2 exhibit improved moisture resistance as compared with those of Comparative Examples 1 and 2 wherein the same dyes as in Examples are used but 2-naphthoic acid is not used.

With regard to the clogging resistance (with cap) shown in Table 12, all the ink compositions of Comparative Examples 5 to 8 containing no lithium are evaluated as D but no D-rank evaluation is observed in Examples 1 to 11. Since the property is slightly deteriorated by the addition of urea, it is realized that the amount added thereof is preferably within 6% by weight (Example 4 in comparison with Example 11). In the case that the amount of the alkali metal ion falls within the preferable range relative to the amount of 2-naphthoic acid, the property is further improved (Example 11 in comparison with Examples 6 and 9). Moreover, in the case that the number of moles of lithium relative to the total of sodium, potassium, and ammonium falls within the preferable range, the property is further improved (Example 11 in comparison with Examples 7 to 9).

With regard to the restoration of clogging resistance (without cap) shown in Table 13, no D-rank evaluation is observed in Examples 1 to 11 and all the ink compositions thereof are evaluated as A or B at 1 week. In the case that the amount of the alkali metal ion falls within the preferable range relative to the amount of 2-naphthoic acid, the property is further improved (Example 11 in comparison with Examples 6 and 9). Moreover, in the case that the number of moles of lithium relative to the total of sodium, potassium, and ammonium falls within the preferable range, the property is further improved (Example 11 in comparison with Examples 7 to 9). With regard to the ink droplet deflection, all the ink compositions thereof are evaluated as A or B at 1 week. As compared with those containing no urea (Examples 1 and 2) or one wherein the amount does not fall within the preferable range (Example 3), the property is further improved in the case that the amount of urea added falls within the preferable range (Examples 5 to 11). Moreover, in the case that the amount of the alkali metal ion falls within the preferable range relative to the amount of 2-naphthoic acid, the property is further improved (Example 11 in comparison with Examples 6 and 9).

With regard to the ink resistance of parts, in the case that the amount of the alkali metal ion falls within the preferable range relative to the amount of 2-naphthoic acid, the property is further improved (Examples 1 to 4, 7, 8, and 11 in comparison with Examples 5 and 10). When the floating foreign matter was collected by filtration and characterized on FT-IR, it was found to be an alkali metal salt of stearic acid. Since the ink compositions of Examples 5 and 10 have high pH, it is considered that the stearic acid-based compound contained in polypropylene is eluted.

Examples 12 to 21 and Comparative Examples 9 to 15

Each of ink compositions of Examples 12 to 21 and Comparative Examples 9 to 15 was prepared by mixing and dissolving respective components at a blending ratio shown in Table 14 and filtering the resulting solution under pressure through a membrane filter having a pore diameter of 1 μm. Each component of the ink compositions shown in Table 14 is represented as % by weight of each component relative to the total amounts of the ink compositions. In the composition of Comparative Example 12, 2-naphthoic acid was not completely dissolved and hence an ink composition usable for evaluation could not be obtained. Moreover, with regard to Comparative Example 13, the resulting ink showed pH 11.8, so that a problem on ink resistance of printer parts arose and hence it was impossible to evaluate the ink.

The ratios of the number of moles of the lithium ion and the number of moles of the sodium ion+the potassium ion relative to the number of moles of the sulfoalkyl group having an ionic hydrophilic group of the cyan dye in the composition, the ratio of the number of moles of the sodium ion+the potassium ion relative to the number of moles of the carboxyl group of 2-naphthoic acid, and the like are as shown in Table 15.

TABLE 14

|  | C dye | Comparative dye | 2-Naphthoic acid | LiOH•H$_2$O | NaOH | Urea | Glycerin | Triethylene glycol monobutyl ether | Triethylene glycol | triethanolamine | Olfin E1010 | Water | Total |
|---|---|---|---|---|---|---|---|---|---|---|---|---|---|
| Example 1 | 4.700 |  | 2.000 | 0.225 | 0.215 |  | 10.000 | 10.000 | 4.000 | 0.500 | 0.800 | 67.560 | 100.000 |
| Example 2 | 4.700 |  | 2.000 | 0.225 | 0.215 | 0.500 | 10.000 | 10.000 | 3.800 | 0.500 | 0.800 | 67.260 | 100.000 |
| Example 3 | 4.700 |  | 2.000 | 0.225 | 0.215 | 7.000 | 10.000 | 10.000 | 2.000 | 0.500 | 0.800 | 62.560 | 100.000 |
| Example 4 | 4.700 |  | 2.000 | 0.050 | 0.380 |  | 10.000 | 10.000 | 4.000 | 0.500 | 0.800 | 67.570 | 100.000 |
| Example 5 | 4.700 |  | 2.000 | 0.325 | 0.210 |  | 10.000 | 10.000 | 4.000 | 0.500 | 0.800 | 67.555 | 100.000 |
| Example 6 | 4.700 |  | 2.000 |  | 0.430 | 4.000 | 10.000 | 10.000 | 2.800 | 0.500 | 0.800 | 64.770 | 100.000 |
| Example 7 | 4.700 |  | 2.000 | 0.050 | 0.380 | 4.000 | 10.000 | 10.000 | 2.800 | 0.500 | 0.800 | 64.770 | 100.000 |
| Example 8 | 4.700 |  | 2.000 | 0.365 | 0.080 | 4.000 | 10.000 | 10.000 | 2.800 | 0.500 | 0.800 | 64.755 | 100.000 |
| Example 9 | 4.700 |  | 2.000 | 0.325 | 0.120 | 4.000 | 10.000 | 10.000 | 2.800 | 0.500 | 0.800 | 64.755 | 100.000 |
| Example 10 | 4.700 |  | 2.000 | 0.225 | 0.215 | 4.000 | 10.000 | 10.000 | 2.800 | 0.500 | 0.800 | 64.760 | 100.000 |
| Comparative Example 1 |  | 4.700 |  |  |  |  | 10.000 | 10.000 | 5.800 | 0.500 | 0.800 | 68.200 | 100.000 |
| Comparative Example 2 | 4.700 |  |  |  |  |  | 10.000 | 10.000 | 5.800 | 0.500 | 0.800 | 68.200 | 100.000 |
| Comparative Example 3 | 4.700 |  |  |  |  | 4.000 | 10.000 | 10.000 | 4.600 | 0.500 | 0.800 | 65.400 | 100.000 |
| Comparative Example 4 | 4.700 |  | 2.000 |  |  |  | 10.000 | 10.000 | 4.000 | 0.500 | 0.800 | 68.000 | 100.000 |
| Comparative Example 5 | 4.700 |  |  | 0.200 |  |  | 10.000 | 10.000 | 5.800 | 0.500 | 0.800 | 68.000 | 100.000 |
| Comparative | 4.700 |  | 2.000 | 0.450 |  |  | 10.000 | 10.000 | 4.000 | 0.500 | 0.800 | 67.550 | 100.000 |

TABLE 14-continued

| | C dye | Compara- tive dye | 2- Naphthoic acid | LiOH•H$_2$O | NaOH | Urea | Glyc- erin | Triethylene glycol monobutyl ether | Triethyl- ene glycol | trieth- anol- amine | Olfin E1010 | Water | Total |
|---|---|---|---|---|---|---|---|---|---|---|---|---|---|
| Example 6 Comparative Example 7 | 4.700 | | 2.000 | 0.450 | | 4.000 | 10.000 | 10.000 | 2.800 | 0.500 | 0.800 | 64.750 | 100.000 |

C dye: Compound F.
Comparative Dye: C.I. Direct Blue 199
Olfin E1010: trade name, manufactured by Nisshin Chemical Industry Co.

TABLE 15

| | Li(number of moles)/ sulfoalkyl group(*) (number of moles) | Na + K(number of moles)/ sulfoalkyl group(*) (number of moles) | Na + K(number of moles)/carboxyl group (number of moles) | Dye/2- naphthoic acid (weight ratio) | Alkali metal (number of moles)/ sulfoalkyl group(*) + carboxyl group (number of moles) |
|---|---|---|---|---|---|
| Example 1 | 1.53 | 0.53 | 0.46 | 2.35 | 0.96 |
| Example 2 | 1.53 | 0.53 | 0.46 | 2.35 | 0.96 |
| Example 3 | 1.53 | 0.53 | 0.46 | 2.35 | 0.96 |
| Example 4 | 1.12 | 0.94 | 0.82 | 2.35 | 0.96 |
| Example 5 | 1.77 | 0.30 | 0.26 | 2.35 | 0.96 |
| Example 6 | 1.00 | 1.06 | 0.93 | 2.35 | 0.96 |
| Example 7 | 1.12 | 0.94 | 0.82 | 2.35 | 0.96 |
| Example 8 | 1.86 | 0.20 | 0.17 | 2.35 | 0.96 |
| Example 9 | 1.77 | 0.30 | 0.26 | 2.35 | 0.96 |
| Example 10 | 1.53 | 0.53 | 0.46 | 2.35 | 0.96 |
| Comparative Example 1 | — | — | — | — | — |
| Comparative Example 2 | 1.00 | 0 | — | — | 1.00 |
| Comparative Example 3 | 1.00 | 0 | — | — | 1.00 |
| Comparative Example 4 | 1.00 | 0 | 0 | 2.35 | 0.47 |
| Comparative Example 5 | 1.47 | 0 | — | — | 1.47 |
| Comparative Example 6 | 2.06 | 0 | 0 | 2.35 | 0.96 |
| Comparative Example 7 | 2.06 | 0 | 0 | 2.35 | 0.96 |

(*)Sulfoalkyl group: a sulfoalkyl group having an ionic hydrophilic group

Printing for Recorded Matter

The ink compositions of Examples 12 to 21 and Comparative Examples 9 to 11, 14, and 15 mentioned above each was filled in a special cartridge (cyan chamber) using an ink jet printer Stylus Color 880 (manufactured by Seiko Epson Corporation) and printing and evaluation were performed on an ink jet special recording medium (PM photographic paper; manufactured by Seiko Epson Corporation, Model No.; KA420PSK) as follows.

Evaluation of Ozone Resistance

Using the cartridge filled with each of the ink compositions of Example 12 and Comparative Example 9, printing was performed while adjusting the applied duty to give an OD (optical density) value falling within the range from 0.9 to 1.1 for each ink composition. After left standing in a normal temperature and normal humidity environment without direct sunlight for one day, ozone resistance of the printed matter obtained was evaluated under the following conditions.

Using an ozone weather meter Model OMS-H (manufactured by Suga Test Instruments Co., Ltd.), the printed matter was exposed under the conditions of 24° C. and 60% RH and an ozone concentration of 10 ppm for 12 hours.

An OD (optical density) value of the exposed sample was measured by means of a reflective densitometer ("Spectrolino", manufactured by Gretag). By substituting each measured value into the following equation, the relict optical density (ROD) after color fading was obtained.

ROD(%)=($D_n$/$D_0$)×100 wherein $D_n$: OD after irradiation test, $D_0$: OD before irradiation test.

A: ROD (%) is 85% or more.

B: ROD (%) is from 70% to less than 85%.

C: ROD (%) is from 55% to less than 70%.

D: ROD (%) is less than 55%.

As a result, the ink composition of Example 12 was evaluated as A and the ink composition of Comparative Example 9 as D.

Evaluation of Bronzing

Using the cartridge filled with each of the ink compositions of Examples 12 to 21 and Comparative Examples 10, 11, 14, and 15, 32-block patch images toward maximum ink-charged amount were printed in an environment of 32° C. and 65% RH (32: maximum, 0: no printing). A gradation at which bronzing occurs was visually judged. The results thereof are shown in Table 16.

Evaluation of Clogging Property (with Cap)

Using the cartridge filled with each of the ink compositions of Examples 12 to 21 and Comparative Examples 10, 11, 14, and 15, printing was continued for 10 minutes. After normal ejection was confirmed for all nozzles, they were left standing in an environment of 60° C. and 15% RH for 3 weeks. After the standing, cleaning operations were repeated until all the nozzles ejected inks equally to their initial state and aptness to restoration was evaluated. The results thereof are shown in Table 16.

A: Nozzles are restored equally to initial state by performing the cleaning operation from 1 to 4 times.

B: Nozzles are restored equally to initial state by performing the cleaning operation from 5 to 8 times.

C: Nozzles are restored equally to initial state by performing the cleaning operation from 9 to 12 times.

D: Nozzles are not restored even by performing the cleaning operation within practical number of times.

Evaluation of Clogging Property (without Cap)

(Restoration from Clogging)

Using the cartridge filled with each of the ink compositions of Examples 12 to 21 and Comparative Examples 10, 11, 14, and 15, printing was continued for 10 minutes. After normal ejection was confirmed for all nozzles, the recording head was left standing with removing the head cap in an environment of 40° C. and 20% RH for 1 week or 2 weeks. After the standing, cleaning operations were repeated until all the nozzles ejected inks equally to their initial state and aptness to restoration was evaluated. The results thereof are shown in Table 16.

A: Nozzles are restored equally to initial state by performing the cleaning operation from 1 to 4 times.

B: Nozzles are restored equally to initial state by performing the cleaning operation from 5 to 8 times.

C: Nozzles are restored equally to initial state by performing the cleaning operation from 9 to 12 times.

D: Nozzles are not restored even by performing the cleaning operation within practical number of times.

(Ink Droplet Deflection)

Using the above printer restored from the clogging, a solid pattern was printed at a duty of 40%. According to the following criteria, judgment was visually performed. The results thereof are shown in Table 16.

A: The solid pattern is filled and no change is observed as compared with the initial state.

B: Slight change is observed as compared with the initial state.

C: The solid pattern is not filled and many streaks are observed.

TABLE 16

| | Bronzing resistance | Clogging resistance (with cap) | Clogging resistance (without cap) | | | |
|---|---|---|---|---|---|---|
| | | | Restoration | | Ink droplet deflection | |
| | | | 1 week | 2 weeks | 1 week | 2 weeks |
| Example 1 | 22 | A | A | A | A | B |
| Example 2 | 24 | A | A | A | A | B |
| Example 3 | 32 | C | C | C | A | A |
| Example 4 | 20 | B | A | A | A | B |
| Example 5 | 23 | A | B | B | A | C |
| Example 6 | 25 | C | B | B | A | A |
| Example 7 | 26 | C | B | B | A | A |
| Example 8 | 32 | B | C | C | A | B |
| Example 9 | 29 | B | C | C | A | B |
| Example 10 | 28 | B | B | B | A | A |
| Comparative Example 2 | 9 | A | A | A | A | A |
| Comparative Example 3 | 13 | B | B | B | A | A |
| Comparative Example 6 | 25 | A | B | B | C | C |
| Comparative Example 7 | 30 | B | C | C | B | C |

The performance of bronzing resistance is improved by the use of 2-naphthoic acid (Comparative Example 14 in comparison with Comparative Example 10) and is further improved by the addition of urea (Examples 13, 14, and 17 to 21). At that time, a larger effect is obtained when the content of urea is 1% by weight or more based on the ink composition. Moreover, the ink compositions wherein the number of moles of lithium is 1.2 times and the total number of moles of sodium and potassium is not more than 0.7 time the number of moles of the sulfoalkyl group having an ionic hydrophilic group of the cyan dye exhibit a higher bronzing resistance as compared with the ink compositions wherein a lithium ion and a sodium ion or a potassium ion are contained but the content does not fall within the preferable range (Example 12 in comparison with Example 15 and Example 21 in comparison with Examples 17 and 18).

With regard to the clogging resistance (with cap), the ink compositions wherein the number of moles of lithium is 1.2 times and the number of moles of the total of sodium and potassium is not more than 0.7 time the number of moles of the sulfoalkyl group having an ionic hydrophilic group of the cyan dye exhibit an improved performance as compared with the ink compositions wherein a lithium ion and a sodium ion or a potassium ion are contained but the content does not fall within the preferable range (Example 12 in comparison with Example 15 and Example 21 in comparison with Examples 17 and 18). Moreover, the decrease of clogging resistance caused by urea is small when the content of urea is 6% by weight or less (Example 13 in comparison with Example 14).

The restoration of clogging resistance (without cap) and performance in ink droplet deflection are improved by the use of NaOH. The decrease of restoration caused by urea is small when the content of urea is 6% by weight or less (Examples 13 and 21 in comparison with Example 14) and the ink droplet deflection can be reduced when the content is 1% by weight or more (Example 21 in comparison with Example 13). Moreover, a higher effect is observed in the case that the total number of moles of sodium and potassium is 0.3 time the number of moles of the carboxyl group of 2-naphthic acid (Example 12 in comparison with Example 16 and Example 21 in comparison with Examples 19 and 20).

The invention claimed is:

1. An ink composition comprising at least water, a cyan dye represented by general formula (2) shown below and an aromatic compound having a carboxyl group, wherein the ink composition contains a lithium ion and also contains a sodium ion and/or a potassium ion:

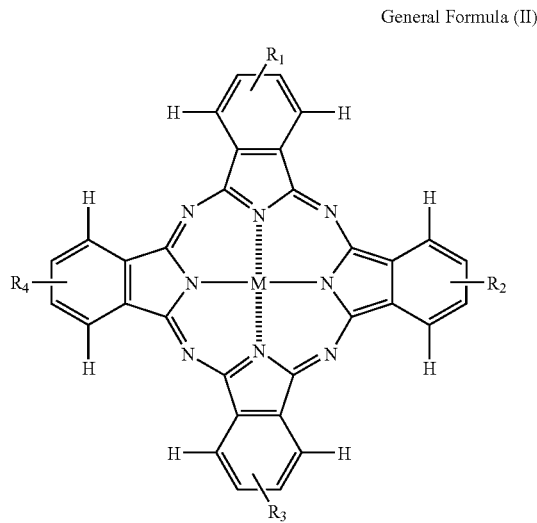

General Formula (II)

wherein M represents a hydrogen atom, a copper metal element or an oxide, hydroxide or halide thereof; wherein $R^1$ to $R^4$ each independently represents —$SO_2$—Z, and each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that at least one of four Z's is a sulfoalkyl group having an ionic hydrophilic group as a substituent; and wherein a number of moles of the lithium ion is 1.2 times or more relative to a number of moles of the ionic hydrophilic group and a total number of moles of the sodium ion and the potassium ion is 0.7 times or less relative to a number of moles of the ionic hydrophilic group.

2. The ink composition according to claim 1, wherein the counter cation of the sulfoalkyl group is a lithium cation.

3. The ink composition according to claim 1, wherein the total of the number of the moles of the sodium ion and the potassium ion is 0.3 times or less relative to the number of moles of the carboxyl group of the aromatic compound having a carboxyl group.

4. The ink composition according to claim 1, wherein the wherein the total of the number of the moles of the lithium ion, the sodium ion and the potassium ion is from 0.8 times to 1.2 times relative to the total of the number of moles of the sulfoalkyl group having an ionic hydrophilic group of the cyan dye and the number of moles of the carboxyl group of the aromatic compound having a carboxyl group.

5. The ink composition according to claim 1, which further contains urea.

6. The ink composition according to claim 1, wherein the aromatic compound having a carboxyl group is an aromatic compound having one carboxyl group.

7. The ink composition according to claim 1, wherein the aromatic compound having a carboxyl group is a compound having a naphthalene skeleton.

8. The ink composition according to claim 1, which comprises the aromatic compound having a carboxyl group in an amount of 0.1 to 10% by weight based on the total amount of the ink composition.

9. The ink composition according to claim 1, wherein the content ratio of the colorant, including the cyan dye, and the aromatic compound having a carboxyl group is from 1:0.2 to 1:10 in terms of weight ratio.

10. An ink jet recording method comprising ejecting a liquid droplet of an ink composition according to claim 1, and attaching the liquid droplet onto a recording medium.

11. A recorded matter which is recorded with the ink composition according to claim 1.

* * * * *